United States Patent
Saito et al.

(10) Patent No.: US 7,666,049 B2
(45) Date of Patent: Feb. 23, 2010

(54) ELECTRODEPOSITION DISPLAY PANEL MANUFACTURING METHOD, ELECTRODEPOSITION DISPLAY PANEL, AND ELECTRODEPOSITION DISPLAY DEVICE

(75) Inventors: Noriyuki Saito, Kanagawa (JP); Yoshinori Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 10/546,540

(22) PCT Filed: Feb. 26, 2004

(86) PCT No.: PCT/JP2004/002299
§ 371 (c)(1), (2), (4) Date: Aug. 23, 2005

(87) PCT Pub. No.: WO2004/079443
PCT Pub. Date: Sep. 16, 2004

(65) Prior Publication Data
US 2006/0152474 A1    Jul. 13, 2006

(30) Foreign Application Priority Data
Mar. 6, 2003    (JP) ............................... 2003-060178

(51) Int. Cl.
*H01J 9/24* (2006.01)
*H01J 9/26* (2006.01)
*H01J 63/04* (2006.01)
*H01J 1/62* (2006.01)

(52) U.S. Cl. .................. 445/24; 345/107; 313/506; 445/25; 445/23; 445/1

(58) Field of Classification Search .............. None
See application file for complete search history.

(56) References Cited

U.S. PATENT DOCUMENTS 3,808,769 A    5/1974    Gardiner et al.
5,943,113 A *  8/1999    Ichihashi ................ 349/187

(Continued)

FOREIGN PATENT DOCUMENTS

JP    49-105138    9/1974

(Continued)

OTHER PUBLICATIONS

Machine translation of JP2003-005224 (Matsumoto et al).*

*Primary Examiner*—Nimeshkumar D. Patel
*Assistant Examiner*—Natalie K Walford
(74) *Attorney, Agent, or Firm*—Robert J. Depke; Rockey, Depke & Lyons, LLC

(57) ABSTRACT

An electrodeposition display panel manufacturing method capable of manufacturing a highly reliable display panel in a short time and effectively, an electrodeposition display panel, and an electrodeposition display device are provided. Openings (5A), (5B) are provided in a rear substrate (2) of the cell. A nozzle (7A) to which an injector (8) is connected on the other side is inserted into the opening (5A), and a nozzle (7B) is inserted into the opening (5B). On the other end side of the nozzle (7B), a container for recovering a spilled display material (6) and a decompressor are arranged. While the display material (6) is pressure-injected from the opening (5A), evacuation and discharging air bubbles and the like are performed from the opening (5B). Thereby, the display material (6) is filled in the cell.

38 Claims, 23 Drawing Sheets

U.S. PATENT DOCUMENTS

| | | | |
|---|---|---|---|
| 6,095,203 A * | 8/2000 | Yamamoto et al. | 141/59 |
| 6,204,895 B1 * | 3/2001 | Nakamura et al. | 349/5 |
| 6,794,220 B2 * | 9/2004 | Hirai et al. | 438/99 |
| 7,324,259 B2 * | 1/2008 | Kokeguchi et al. | 359/265 |
| 7,436,577 B2 * | 10/2008 | Moriyama et al. | 359/296 |

FOREIGN PATENT DOCUMENTS

| | | |
|---|---|---|
| JP | 49-131460 | 12/1974 |
| JP | 50-104661 | 8/1975 |
| JP | 51-021347 | 2/1976 |
| JP | 52-037456 | 3/1977 |
| JP | 53-049447 | 4/1978 |
| JP | 56-091220 | 7/1981 |
| JP | 03-138615 | 6/1991 |
| JP | 03-138614 | 7/1991 |
| JP | 04-172322 | 6/1992 |
| JP | 07-234412 | 9/1995 |
| JP | 09-236810 | 9/1997 |
| JP | 2003-005224 | 1/2003 |

* cited by examiner

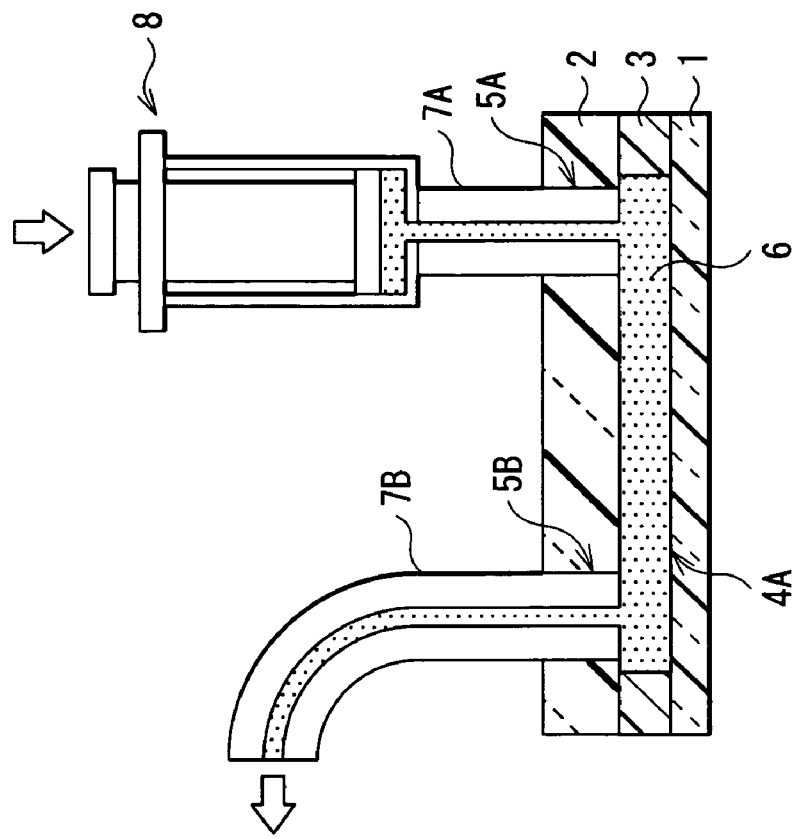
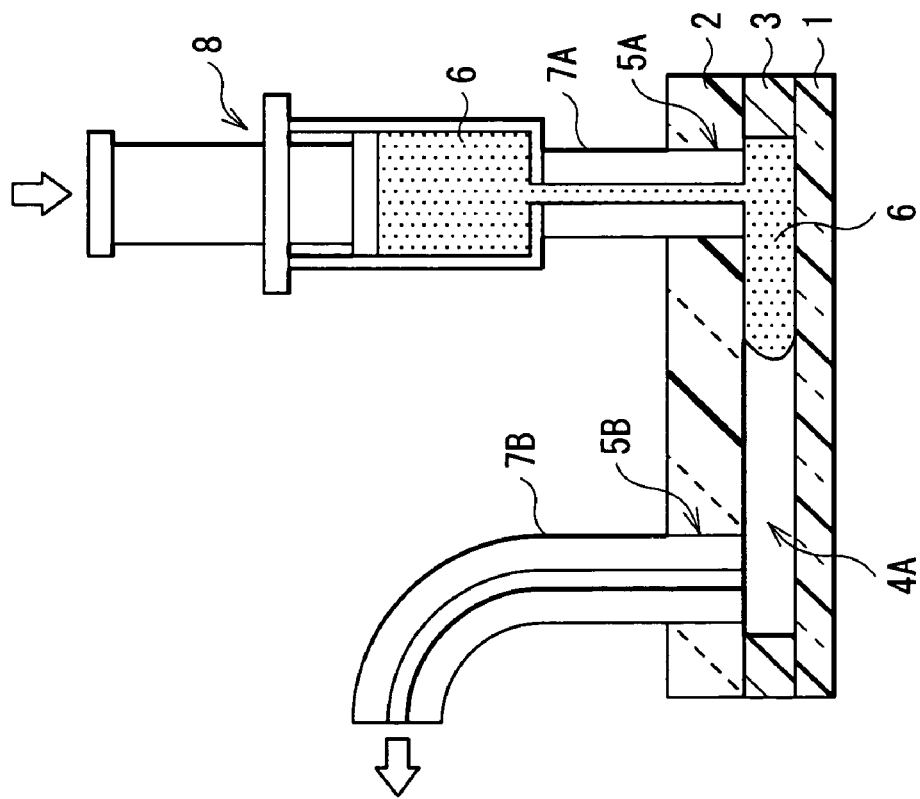
FIG. 4A
FIG. 4B

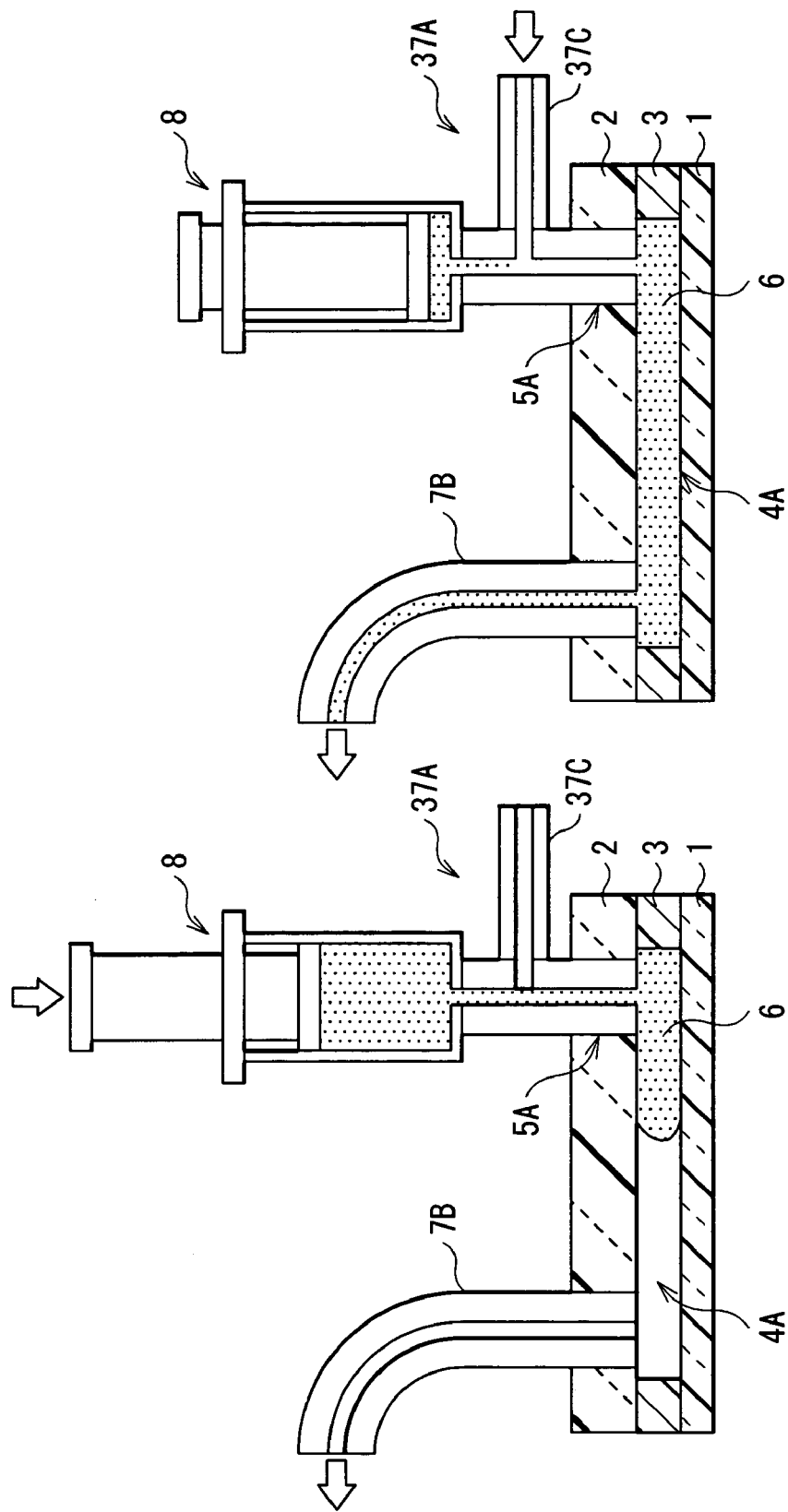

ELECTROLYTIC SOLUTION

ELECTRODEPOSITION DISPLAY PANEL MANUFACTURING METHOD, ELECTRODEPOSITION DISPLAY PANEL, AND ELECTRODEPOSITION DISPLAY DEVICE

This application claims priority to Japanese Patent Application Number JP2003-60178, filed Mar. 6, 2003 which is incorporated herein by reference.

TECHNICAL FIELD

The present invention relates to a method of manufacturing an electrodeposition display panel for performing display by utilizing electrochemical deposition and dissolution of a metal, in which a display material containing metal ions is sandwiched between a pair of electrode substrates, an electrodeposition display panel manufactured by using the method, and an electrodeposition display device.

BACKGROUND ART

In recent years, as networks have become common, documents, which were traditionally distributed in the shape of printed matters have been distributed as so-called electronic documents. Further, books, magazines and the like have been often provided as so-called electronic publishing. However, it is suggested that in terms of reading such information, traditional light emitting displays cause acute tiredness in view of human engineering and are not appropriate for long reading. Further, when the traditional light emitting display is used for a portable information terminal, continuous operating time by a battery is not sufficient in terms of power consumption, and such portable information terminal does not have sufficient usefulness to the degree that the portable information terminal can outpace paper newspaper, paper magazines and the like in terms of handling and carry. Meanwhile, reflective liquid crystal displays can be driven by low power consumption. However, the reflectance in displaying while color is 30%, which means the visibility is significantly poor compared to of paper printed matters, and therefore, the reflective liquid crystal display is not appropriate for long reading as well.

Therefore, a so-called paperlike display or an electronic paper has been developed. The display mechanism thereof is as follows. Any paperlike display sandwiches a display material between two electrode substrates and selectively display according to whether an electric field is applied to the display material or not. For example, electrophoresis for moving colored particles between the electrodes, or a method for developing the selected color by rotating dichromatic particles in an electric field are well known. However, these methods have disadvantages that the contrast is low since light is absorbed in the gap between particles, and the practical writing speed (within 1 sec) is not able to be obtained unless the driving voltage is 100 V or more. Meanwhile, an electrochromic display (ECD), which develops color based on electrochemical action has the high contrast, and therefore the ECD has been already in practical use as a light control glass and a clock/watch display. However, black color in the ECD is not high grade generally. Further, it is thinkable that there is a problem that since an organic material is used as a black material, black color is faced and the black color density is decreased with age.

Meanwhile, recently, an electrodeposition display device (EDD) for performing display by utilizing deposition and dissolution of a metal by electrochemical redox has been suggested. The display panel of the EDD is basically a cell having the internal construction as of FIG. 23. In the cross section of the cell, a transparent substrate 101 and a rear substrate 102 are oppositely arranged, and a transparent electrode 103 and an opposite electrode (common electrode) 104 are formed on the respective opposed face sides of the substrates. Further, a gelatinous electrolyte layer 105 containing metal ions such as silver ions as a display material is sandwiched between the transparent substrate 101 and the rear substrate 102.

In the display as above, color is developed by depositing the metal ions in the electrolyte layer 105 as a metal on the surface of the transparent electrode 103 by applying a given voltage to the electrodes 103 and 104, and color is extinguished by dissolving the deposited metal by applying a reverse voltage. In the EDD, the contrast and the black color density can be improved by using the foregoing display method and adding a white color pigment to the electrolyte layer.

The display panel of the EDD is manufactured by a method, in which an outer shell of the cell is formed by opposing the electrode substrates, and then a display material in a state of fluid is filled inside thereof. Specifically, vacuum injection method has been traditionally adopted. The vacuum injection method is performed as shown in FIG. 24. That is, a vacant cell 110 provided with an opening 110A on one side edge is accommodated in a chamber 130. After vacuumization is performed to the inside, the opening 110A is impregnated with a display material 131, and air is leaked in the chamber 130 to return the pressure around the cell 110 to the ambient pressure. At this time, the display material 131 is pressed by the ambient pressure, and filled inside the depressurized cell 110. This method is the most general technique in the liquid crystal injection step in manufacturing a liquid crystal panel, and is often used for manufacturing a display panel of the ECD as well.

In the case of the EDD, the cell 110 is formed, for example, as follows. First, a thick adhesive film 106 is laid along the edge of the rear substrate 102 except for the opening 110A (FIG. 25A). The adhesive film 106 is electrolytic solution-resistant, and is die-cut in the shape of a picture frame except for the opening 110A. Next, the transparent substrate 101 is further laid on the rear substrate 102, and thermocompression bonding and the like is thereto performed (FIG. 25B). Then, a void is formed between the substrates 101 and 102 by the thickness of the adhesive film 106, and the electrolytic solution is injected into the void. After the electrolytic solution is injected, when the opening 110A is sealed by a sealing member 107, the cell 110 is hermetically sealed and appearance as a display panel is formed (FIG. 26).

As above, the vacuum injection method is a technique universally applicable. However, in the past, there have been problems as follows: (1) since the liquid crystal material and the display materials such as an electrolytic solution are exposed to vacuum, low-boiling constituents are volatilized and scattered, and therefore the constituent composition is gradually altered; (2) since moisture, impurities, or air bubbles are pushed to the side edge on the other side of the opening into which the display material is injected and remain, display characteristics in the vicinity thereof become deteriorated; and (3) since depressurization is needed, necessary time for the entire injection step becomes long.

Therefore, regarding the liquid crystal panel, various filling methods have been heretofore suggested. For example, as in FIG. 27, there is a method, in which openings 111A and 111B are provided at two locations on the opposite sides of a vacant cell 111 and while injecting liquid crystal from the opening 111A at normal pressures, deaeration is performed from the opening 111B, and thereby the liquid crystal is filled (refer to Japanese Unexamined Patent Application Publication No. H07-234412). Further, as in FIG. 28, a method in which of a vacant cell 121, at least a portion except for an opening 121B is enclosed in a pressure bath 122 to which pressure is applied, and thereby a difference is made between a pressure P1 applied to an opening 121A and a pressure P2 applied to an opening 121B (P1>P2), and liquid crystal is injected from the opening 121A is disclosed (refer to Japanese Unexamined Patent Application Publication No. H09-236810). In these methods, a pressure difference between the inside and the outside of the cell can be generated without using a chamber, there is no danger of composition alteration of the liquid crystal material caused by exposure to vacuum, and the depressurization step is not necessary. Further, by performing suction and evacuation from the opening on the other side of the injection side, liquid crystal is filled into the cell more positively compared to in the vacuum injection method, and it is possible to prevent residual such as air bubbles and impurity from remaining in the cell, and prevent the concentration in the cell from being changed.

However, regarding the EDD recently developed, its electrolytic solution filling method has not been established yet, and discussion on which method is suitable has not been made. As for applying the vacuum injection method to the EDD, the following inherent problems exist. Therefore, a new method of manufacturing a panel outplacing the vacuum injection method has been aspired.

(1) Even if a small amount of the electrolytic solution is adhered around the opening, effect of the adhesive is significantly lost, and therefore sealing becomes difficult. Therefore, in the vacuum injection method in which part of the sealing material is opened and which is impregnated in the electrolytic solution, complete sealing is difficult.

(2) Since an organic solvent is used for the electrolytic solution, solvent resistance of the substrate and the sealing material is strictly needed. Therefore, types of usable materials are limited.

(3) When the boiling point of the electrolytic solution is not sufficiently high, or when the electrolytic solution is volatilized, decomposed, and generates corrosive gas, the inside of the chamber and the decompressor are contaminated in the vacuum injection method. Further, the electrolytic solution which is volatilized and adhered inside the unit may be dried, separated, and mixed in the solution.

(4) The viscosity of the electrolytic solution is significantly high compared to of the liquid crystal. Therefore, injection takes very long time.

(5) In general, it is not possible to leave for a long time the prepared electrolytic solution at room temperatures. When an electrolytic solution in which a powder material is dispersed is used, the powder material is precipitated. When an organic oxide is used as a polymerization initiator for a resin mixed in the electrolytic solution, deterioration is caused at room temperatures.

(6) When an electrolytic solution in which a powder material is dispersed is used, the powder material and the electrolytic solution are separated in the cell in the process of injection.

(7) When a flexible display panel is manufactured by using a film substrate and the like, filling a display material is difficult by the vacuum injection method.

DISCLOSURE OF THE INVENTION

In view of the foregoing problems, it is an object of the present invention to provide an electrodeposition display panel manufacturing method capable of manufacturing a highly reliable display panel in a short time and efficiently, an electrodeposition display panel, and an electrodeposition display device.

The electrodeposition display panel manufacturing method of the present invention is an electrodeposition display panel manufacturing method, in which a display material which contains metal ions and has fluidity at least temporarily is sandwiched between a pair of substrates having each electrode on each opposed face, wherein for a cell including a space which is formed between the pair of substrates, and connected to the outside through one or a plurality of first openings for injecting the display material and one or a plurality of second openings for discharging the display material, a step for filling the space by discharging the display material from the second opening while injecting the display material from the first opening in a state that the display material has fluidity is included.

In the electrodeposition display panel manufacturing method of the present invention, not only the display material is injected from the first opening, but also the display material is concurrently discharged from the second opening. Thereby, the display material is immediately filled in the cell. In general, the display material is the electrolytic solution, in which metal ions, a pigment, a dye, a cross-linked high molecular weight material for gelation and the like are dissolved. The display material has a high viscosity, and has characteristics that the display material itself is not easily filled. However, the space of the electrodeposition display panel is considerably wide, being generally about 30 μm to 150 μm, compared to the layer thickness of liquid crystal in the liquid crystal panel (about 5 μm or less). Therefore, while in the liquid crystal panel, liquid crystal is filled by mainly utilizing capillary phenomenon, filling the display material by pressurization is suitable in the electrodeposition display panel. This method is suitably applicable to, for example, the display material having a viscosity of 30,000 mPa·s or less measured by a rotating viscometer where the rotor frequency is 0.5 rpm. Then, when discharging the display material is performed under depressurization as appropriate, the filling time can be shortened. As above, when the display material is injected at the pressure equal to or more than the normal pressures, composition alteration due to volatilization is not caused. In addition, even if the display material with a high viscosity is injected, or even if the injection resistance becomes larger since a separation preventive layer is formed on the substrate, injection can be performed in a relatively short time. Further, by discharging the display material from the second opening immediately after starting filling, air bubbles remaining in the cell, powder materials whose constituent is separated in the cell during filling, and unnecessary matters such as an electrolytic solution are pushed out together, and therefore the display material with a uniform composition can be filled all over inside the cell.

Further, the first and the second openings are preferably formed in the substrate. As described above, the side edge of the electrodeposition display panel is made of a sealing material such as an adhesive film. Though the openings are provided therein in the traditional vacuum injection method as well, hermetically sealing the openings is more difficult than in thin liquid crystal panels. Further, the substrate to be opened is more preferably a resin substrate such as glass epoxy, which is more easily processed.

Further, in the foregoing step, it is preferable that after the nozzle is temporarily attached to at least one of the first and the second openings, the display material is injected and discharged. By using the nozzle, adjustment of pressurization and depressurization to the inside of the cell can be conveniently and immediately performed. Further, the display material to be injected and discharged is prevented from being contacted to the cell, and after that, the opening can be effectively and surely sealed. Further, when the nozzle is not used, by covering the outer circumference of the opening with a mask, the display material is prevented from being contacted to the cell, and after that, the opening can be effectively and surely sealed.

The electrodeposition display panel and the electrodeposition display device of the present invention include: a pair of substrates which is oppositely arranged and has each electrode on each opposed face; a layer which is sandwiched between the pair of substrates, and is made of a display material containing metal ions and having fluidity at least temporarily; a sealing material provided on a side edge of the layer made of the display material; and two or more openings which are provided in the substrate or the sealing material, and in a state of being sealed.

The electrodeposition display panel and the electrodeposition display device of the present invention are respectively the display panel to which the electrodeposition display panel manufacturing method of the present invention is applicable, and the display device using the display panel. That is, the layer made of the display material is constructed by a uniform composition by injection and discharge of the display material through the openings. Further, when the opening is formed in the substrate, the sealing material for sealing the opening is provided on the substrate. Further, when the nozzle is temporarily attached to the opening, the inner shape of the opening corresponds to the shape of the end of the nozzle. In such a case, there is no risk that the display material is adhered to the circumference of the opening during injection, and therefore the opening is sufficiently hermetically sealed by the sealing material.

BRIEF DESCRIPTION OF THE DRAWINGS

FIG. 1A is a construction view of a display panel to be manufactured, and FIG. 1B is a conceptual explanation drawing of the manufacturing method thereof;

FIGS. 4A and 4B are views showing a filling method of display material in the cell shown in FIGS. 3A and 3B;

FIGS. 8A and 8B are views showing a modification of the filling method explained in FIGS. 4A and 4B;

BEST MODE FOR CARRYING OUT THE INVENTION

An embodiment of the present invention will be hereinafter described in detail with reference to the drawings.

Figure 1A:
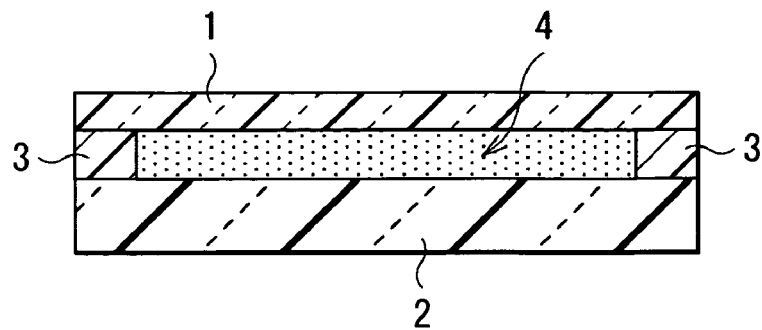
FIGS. 1A and 1B are views for explaining an electrodeposition display panel manufacturing method according to an embodiment of the present invention.

As shown in FIG. 1A, an electrodeposition display panel to be herein manufactured includes a pair of substrates which is oppositely arranged and has each electrode on each opposed face (a transparent substrate 1 and a rear substrate 2, however, in the case of collectively meaning the both, hereinafter simply referred to as substrates 1 and 2), and an electrolyte layer 4 which is sandwiched between these substrates 1 and 2 and whose circumference is sealed by a sealing material 3. In this embodiment, the display panel having the foregoing structure is manufactured by filling a display material 6 composing the electrolyte layer 4 into a vacant cell. That is, as in FIG. 1B, openings 5A and 5B are provided in the vacant cell, while the display material 6 is injected through the opening 5A, the display material 6 is discharged together with air bubbles from the opening 5B, and thereby filling is performed.

First, descriptions will be given of major components of this display panel.

The transparent substrate 1 is a substrate on the display face side. As a transparent substrate 1, it is possible to use a transparent glass substrate such as a quartz glass plate and a whiteboard glass plate. However, it is also possible to use a substrate made of ester such as polyethylene naphthalate and polyethylene terephthalate; cellulose ester such as polyamide, polycarbonate, and acetylcellulose; fluorine polymer such as polyvinylidene fluoride and tetrafluoro ethylene-hexafluoro propylene copolymer; polyether such as polyoxy methylene; polyolefin such as polyacetal, polystyrene, polyethylene, polypropylene, and methyl pentene polymer; or polyimide such as polyimide-amide and polyether imide. When any of these synthetic resin substrates is used, it is possible to make an unpliable rigid substrate, but it is also possible to make a flexible film substrate. Over the transparent substrate 1, a transparent electrode made of, for example, an ITO thin film, a thin film coated with $SnO_2$ or $In_2O_3$ or the like is formed in a state of stripes.

Meanwhile, the rear substrate 2 provided on the rear side is not necessarily transparent, but it is enough that the rear substrate 2 can surely retain the electrode. For example, a glass substrate such as a quartz glass plate and a whiteboard glass plate, a synthetic resin substrate, a ceramic substrate, a coated paper substrate or a coated wood substrate, a pre-preg or the like can be used. Over the rear substrate 2, an electrode made of a conductive material such as a metal is formed in a state of stripes. The electrodeposition display panel performs display by utilizing deposition and dissolution of silver. Therefore, when a metal such as silver, platinum, and gold whose ionicity is equal to or less than of silver is used for this electrode, wastage due to repeat of electrode reaction can be inhibited.

These substrates 1 and 2 are laid so that their electrodes are perpendicular to each other. These electrodes construct a matrix in which each crossing region is a pixel. In this display panel, matrix driving method is adopted. When a voltage is applied to one stripe for each electrode, display is selectively performed only in one pixel region as the crossing region inbetween. That is, in the selected pixel region as deposition or dissolution of the metal is generated between the electrolyte layer 4 and the electrode of the transparent substrate 1.

The electrolyte 4 is formed by gelating the display material 6, or by impregnating the display material 6 in the gap between a supporting member such as a nonwoven cloth and beads, which lies between the substrates 1 and 2. Here, the display material 6 is an electrolytic solution, in which an electrolyte, metal ions, other additive and the like are dissolved in a solvent. Therefore, when filled, the display material 6 is a fluid with a high viscosity (for example, the viscosity is about 22,000 mPa·s when a pigment dispersing agent is not used). However, after filled, the display material 6 loses its fluidity when the display material 6 is gelated in order to maintain the shape as the electrolyte layer 4.

Any solvent may be used as long as the solvent can dissolve the electrolyte. For example, water, ethyl alcohol, isopropyl, alcohol, propylene carbonate, dimethyl carbonate, ethylene carbonate, γ-butyrolactone, acetonitrile, sulfolane, dimethoxyethane, ethyl alcohol, isopropyl alcohol, dimethyl formamide, dimethyl sulfoxide, dimethyl acetoamide, n-methyl pyrrolidone, the mixture of the foregoing and the like can be used.

As an electrolyte, in addition to a metallic salt functioning as a color developing material for display, if necessary, a substance containing at least one supporting electrolyte of the group selected from quaternary ammonium halide (F, Cl, Br, and I), alkali metal halide (LiCl, LiBr, LiI, NaCl, NaBr, NaI and the like), alkali metallic salt cyanide, alkali metallic salt thiocyanide and the like is dissolved as an electrolyte. Here, as a metal ion constructing the metallic salt functioning as a color developing material for display, bismuth, copper, silver, lithium, iron, chromium, nickel, cadmium and the like can be cited. Any thereof is used singly, or a mixture thereof is used. As a metallic salt, any salt of these metals can be used. For example, in the case of a silver salt, silver nitrate, silver fluoroborate, silver halide, silver perchlorate, silver cyanide, silver thiocyanide and the like can be cited.

Further, in the display material 6, a white color pigment or a colored pigment is dispersed. In order to realize high display contrast, a white color pigment or the like having a refractive index different from of the display material 6 is preferably dispersed. A pigment to be used is not limited to the white color pigment, but tint can be adjusted as appropriate according to characteristics necessary for display. Therefore, one or more colorant materials are preferably dispersed in the display material 6. Any of these pigments can be used singly, or a mixture of a plurality of these pigments can be used. If necessary, surface treatment can be added by a dispersing agent, resins, various coupling agents, an interfacial active agent and the like. The content of the pigment or the dye is not particularly limited.

As a white color pigment, titanium oxide, lead titanate, potassium titanate, zircon oxide, zinc sulfide, antimony oxide, zinc oxide, white lead, magnesium oxide, barium sulfate, calcium sulfate, talc, alumina, calcium carbonate, kaolin clay, mica, magnesium hydrate, calcium sulfate, bentonite, calcium sulfate, silicic anhydride, basic magnesium carbonate, hydrotalcite, hydrated calcium silicate, quartz glass, diatom earth, white carbon and the like are cited, but examples are not limited thereto. Any of these white color pigments can be used singly, or a mixture of a plurality thereof can be used. Among these white color pigments, rutile type titanium oxide having a high refractive index is particularly suitable. Further, in addition to the white color pigment, a fluorescer and a light accumulator can be mixed to emphasize tint associated with the pigment and obtain a function such as luminous property. Further, an organic or inorganic color pigment can be mixed to color in the range, with which display is not prevented and adjust chromaticity. As examples of color pigments other than white color pigment, azo pigments, phthalocyanine pigments, dioxazin pigments, quinacridone pigments, anthlaquinone pigments, benzimidazolone pigments and the like can be cited as organic pigments; and complex oxides composed of titanium, antimony, chromium, nickel, iron, zinc, cobalt, aluminum, silicon, copper, manganese, lithium, phosphorus, calcium, tin and the like can be cited as inorganic pigments. Many thereof have been manufactured and commercially available.

Further, dispersed substances are not limited to the substance for color development, but include powders used for planarizing surface irregularity of the supporting member such as a nonwoven cloth and improving contact with the substrate. When the powder material is used for this purpose, any tint or any refractive index of the powder material is acceptable. When the supporting member and the electrode are contacted uniformly and with no gap inbetween, the amount of metal deposited by applying a voltage becomes uniform, display irregularity becomes small, and extinguishing color by applying a reverse voltage becomes easy. When a dye is dissolved, the dye may be absorbed into a supporting member in the process that the display material 6 is penetrated into the supporting member. In order to prevent such a phenomenon, it is desirable to select the combination of the dye and the supporting member, in which the affinity thereof is low.

In addition, various additives can be contained in the display material 6 according to purposes. For example, in order to uniformalize deposition of metal, a compound containing oxygen, sulfur, nitrogen and the like, specifically, coumarin, nicotine acid, cinnamic acid, ethylene diamine tetra acetic acid, polyvinyl pyrrolidione, benzalacetone and the like can be contained. Further, by adding various resins, the viscosity can be adjusted. By adding a resin having a reactive functional group and performing polymerization by ultraviolet irradiation or heating, the display material 6 can be gelated or have a high viscosity. For the purpose thereof, for example, a substance in which an acrylic group is introduced at the end of a monomer or an oligomer, which is a raw material for a polyether resin or a polyacrylonitrile resin is suitably used. In order to effectively generate polymerization reaction, an appropriate amount of a polymerization initiator can be mixed together with a resin raw material.

As a polymerization initiator, for photo polymerization reaction, 2-ethoxy-2-phenyl acetophenone, 2-hydroxy-2-methy-1-phenyl-propane-1-on, benzoin isopropyl ether, benzophenone, Michler's ketone, chloro thioxanthone, isopropyl thioxanthone, benzyl dimethyl ketal, acetophenone diethyl ketal, α-hydroxycyclohexyl phenyl ketone, 2-hydroxy-2-methyl-phenylpropane and the like can be utilized. For thermal polymerization reaction, in addition to organic oxides such as isobutyryl peroxide, cumyl peroxyneodecanoate, diisopropyl peroxydicarbonate, dimethoxy butyl peroxydicarbonate, octanoyl peroxide, lauroyl peroxide, stearoyl peroxide, succinic peroxide, and benzoyl peroxide; azo polymerization initiators such as 2,2'-azobis(4-methoxy-2,4-dimethyl valeronitrile), dimethyl-2,2'-azobis(2-methyl propionate), 1,1'-azobis(cyclohexane-1-carbonitrile), 2,2'-azobis(N-cyclohexyl-2-methyl propionamide), 2,2'-azobis(2-methyl butyronitrile), 2,2'-azobis[N-(2-propenyl)-2-methyl propionamide], and 2,2'-azobis(N-butyl-2-methyl propionamide) can be utilized.

Next, a method of manufacturing a display panel according to this embodiment will be described.

Figure 1B:
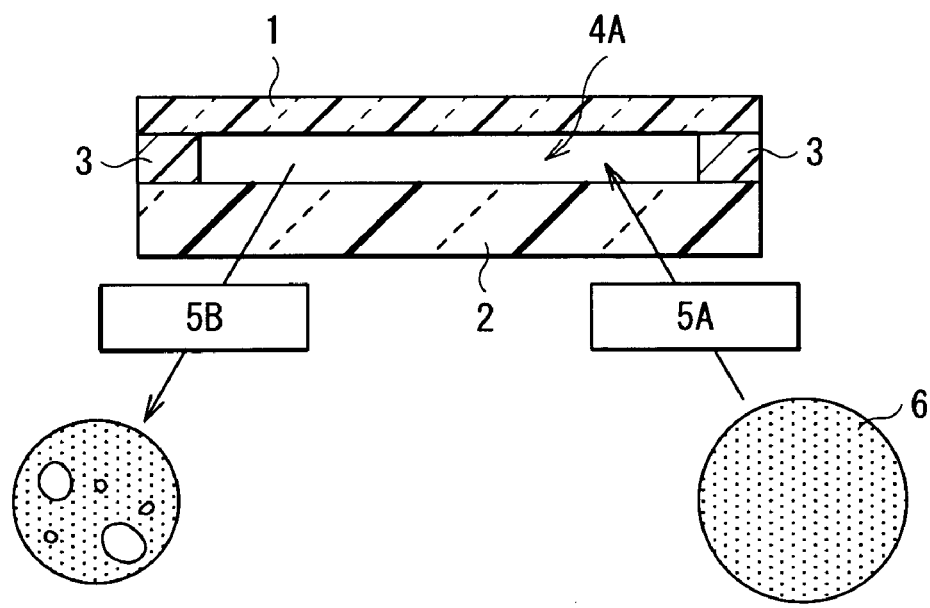

In the method of filling the display material 6 shown in FIG. 1B, the display material 6 is filled in a vacant cell. Here, in the first step (corresponding to a second step in the present invention), by supporting the gap between the substrates 1 and 2 by the sealing material 3, a space 4A is provided, and a vacant cell provided with the openings 5A and 5B, through which the space 4A is connected outside is formed. In the next step (corresponding to a first step in the present invention), the display material 6 in a state of fluid is injected through the opening 5A. In this filling step, of the injected display material 6, a portion in which air bubbles are mixed or a constituent is separated is discharged (while injection is continued) from the separately located opening 5B, and thereby the inside of the space 4A is filled with the uniform display material 6.

That is, in this filling step, when the space 4A is filled with the display material 6, filling is not stopped and the display material 6 is spilled and discharged from the opening 5B. Then, air bubbles involved in the display material 6 are discharged together. Further, when the display material 6 is separated inside the space 4A, or when the distribution of the powders such as a dispersing agent contained in the display material 6 is not uniform, operation of injection and discharge is to be continued until the constituent of the display material 6 becomes uniformly distributed in the space 4A. Consequently, only the display material 6 with uniform composition is filled in the space 4A. For example, when a dispersed substance or a dye is mixed in the display material 6, and a spacer is inserted in the space 4A, fluid of the mixture may be prevented by the spacer, causing composition distribution of the display material 6. However, according to this method, such a problem can be solved. In some cases, quite a lot of display material 6 is discharged once in order to perform discharge for the foregoing purpose. Nevertheless, the display material 6 used here is not expensive, and therefore cost raise can be sufficiently inhibited by recovering and recycling the discharged display material 6.

As the display material 6 to be filled by this method, any material can be used as long as the material passes through the opening 5A provided in the cell and uniformly spreads in the cell. Therefore, the display material 6 with a high viscosity in which a pigment is dispersed at a high mixture ratio, or a resin or the like is mixed can be used. However, if the viscosity of the display material 6 is extremely low, air bubbles may easily remain in the cell. Meanwhile, if the viscosity of the display material 6 is excessively high, a large pressure becomes necessary for injection, and in the result, causing breakage of the cell. Therefore, it is thinkable that the viscosity of the display material 6 is suitably, for example, 30,000 mPa·s (rotating viscometer, rotor frequency: 0.5 rpm) or less. It is desirable to perform injection at an appropriate viscosity correspond to the shape and the size of the cell by using a dispersing agent and various coupling agents, or finishing the surface of the powders with a resin.

For adopting such a filling method, here, at least two openings, that is, an opening for injecting the display material 6 (opening 5A) and an opening for discharging the display material 6 (opening 5B) are provided in the cell. The positions of the openings are not particularly limited, but if possible, the openings are desirably provided in the substrates 1 and 2, since if provided at the position of the sealing material 3 as before, sealing is difficult structurally.

The substrate to be opened may be either the substrate 1 or the substrate 2. Otherwise, both substrates may be opened, for example, the opening for injection is provided in one substrate and the opening for discharge is provided in the other substrate. However, in general, it is preferable that the openings are provided not in the transparent substrate 1 on the display face side but in the rear substrate 2, since influence on display and the panel structure can be avoided. However, when the glass substrate is used, in actuality, it may be difficult to drill the substrate without cracking the thin and rigid substrate, or it may take a lot of trouble to create the opening. Further, when a stress is generated at the opening by an injection pressure, the substrate may be broken. Therefore, it is desirable to use a relatively soft substrate such as a resin as a substrate to be opened. For example, a glass epoxy substrate or a plastic substrate is used.

As shown in the cell plan views of FIGS. 2A to 2D, preferably the positions of the openings 5A and 5B are inside the sealing material 3 indicated by the dotted lines in FIGS. 2A to 2D, and are outside the display region. Further, in order to inject the display material 6 all over inside the space 4A, the openings 5A and 5B are desirably arranged in positions symmetrical to each other. That is, for example, as in FIG. 2A, one opening 5A and one opening 5B are respectively provided in the opposing corners. For another example, as in FIG. 2B, the openings 5A are formed in two corners of one side, and the opening 5B is formed in the center of the side opposite to the side where the openings 5A are formed. For still another example, as in FIG. 2C, the openings 5A are formed in adjacent two corners, and the openings 5B are formed in two corners opposite to the foregoing two corners, respectively.

Figure 2A:
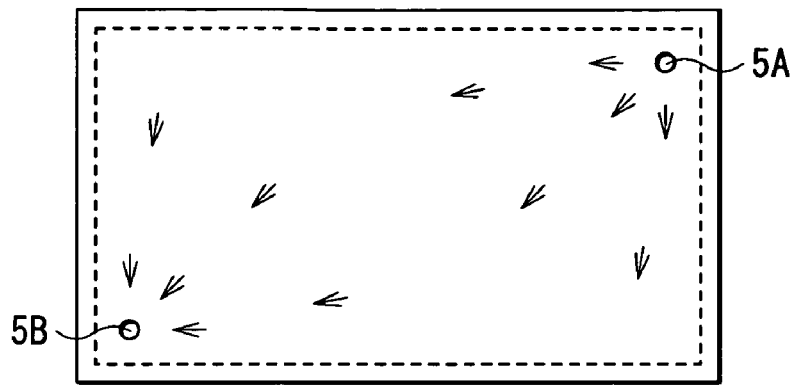
FIGS. 2A to 2D are views showing positions of openings provided in a substrate of the display panel in the manufacturing method explained in FIGS. 1A and 1B.
Figure 2B:
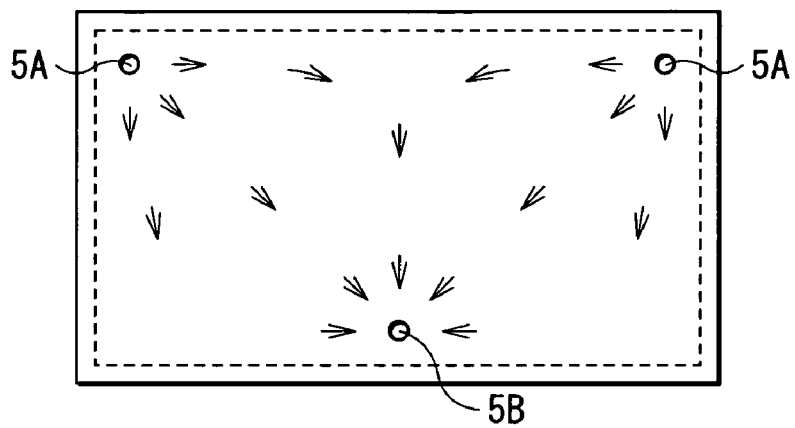
Figure 2C:
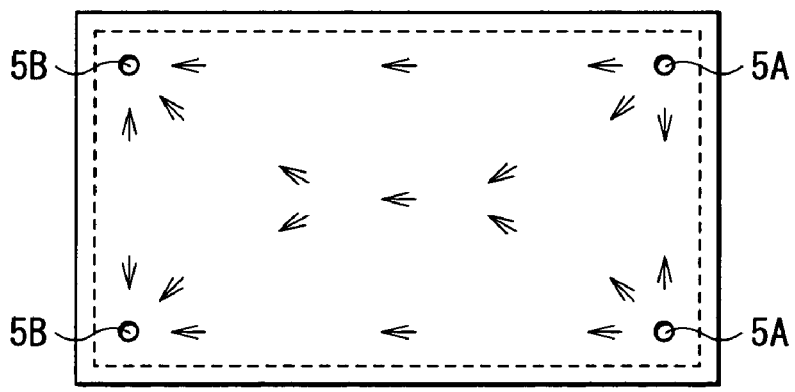
Figure 2D:
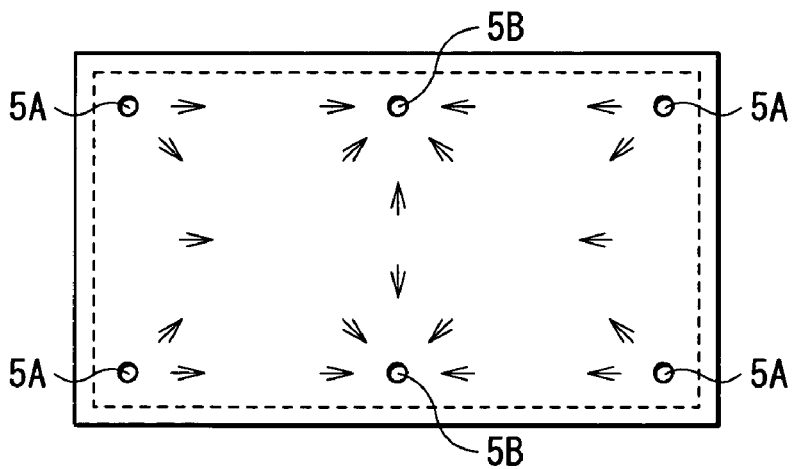

For still another example, as in FIG. 2D, the openings 5A are formed in four corners, and the openings 5B are formed in each central part of two opposed sides. In FIGS. 2A to 2D, the display material 6 is injected in the directions respectively shown in the figures, and finally filled wholly.

The cell having the openings in the substrate as above is formed as follows. First, as in FIG. 3A, for example, the openings 5A and 5B are formed in the rear substrate 2. When the rear substrate 2 is made of glass, the substrate can be drilled by using a drill, laser and the like. When the rear substrate 2 is a glass epoxy substrate, the substrate can be opened by a drill. When the glass is opened by the drill, if the glass is opened in the water spray or flowing water, cutting powders are inhibited from being scattered. Next, on the electrode face of the opened rear substrate 2, as the sealing material 3, an adhesive film stamped in the shape of a continuous picture frame is laid. Further, as in FIG. 3B, the transparent substrate 1 is thereon laid with the electrode face downside. Then, the rear substrate 2 and the transparent substrate 1 are bonded together with the sealing material 3 inbetween by thermocompression bonding. Then, the thickness of the space 4A formed between the substrates 1 and 2 is, for example, about 30 μm to 150 μm.

There is no problem if the display material 6 is gelated after being filled into the space 4A. However, if the display material 6 remains fluid, the gap between the substrates 1 and 2 may be changed, leading to deterioration of display characteristics. Furthermore, if sealing state is not sufficient, the fluid display material 6 may be leaked. Further, display images may be distorted by fluid. Therefore, it is preferable that a supporting member for supporting and fixing the shape of the electrolyte layer 4 such as a nonwoven cloth, beads, and a pigment, that is, a so-called spacer is inserted in the space 4A. This is particularly effective when at least one of the substrates 1 and 2 is made of a highly flexible material such as a film. That is, when deflection and dent are easily generated in the substrate by performing deaeration concurrently with injection to the space 4A, the supporting member previously retained functions for supporting the substrate from inside and assisting filling.

When the filling density of the supporting member is high as in the case that a nonwoven cloth is used as a supporting member, the infiltration rate of the display material 6 to be injected between the substrates becomes slow. Further, when the display material 6 contains a dispersed substance such as a pigment, the dispersed substance may be filtered by the supporting member. Therefore, according to the filling density of the supporting member, the viscosity of the display material 6 to be injected, presence of the dispersed substance, the dispersion density of the dispersed substance, and the particle diameter distribution of the dispersed substance should be adjusted. Further, in order to improve the penetration efficiency of the display material 6, if an interfacial active agent is added to the display material 6, or the supporting member is provided with surface treatment by the interfacial active agent, wetness is remedied, and filling can be effectively performed. Meanwhile, it is desirable that the supporting member does not have excessively high density so that the supporting member does not significantly prevent penetration of the display material 6. Further, when the display material 6 to be injected contains a dispersed substance, it is desirable that powders with sufficiently small particle diameter are dispersed in the display material 6 at a low density, so that the dispersed substance can be distributed as uniform as possible when the display material is penetrated into the supporting member.

Based on the foregoing description, when the display material 6 is gelated, the supporting member is not necessary, and there is no need to note the foregoing. In this case, it is possible to perform filtering more easily and more speedy. Here, since relatively lots of the display material 6 are necessary for injection and discharge, it is advantageous that the supporting member becomes unnecessary by gelation.

Next, descriptions will be given of a specific filling method of the display material with reference to FIGS. 4A and 4B. In FIGS. 4A and 4B, one opening 5A and one opening 5B are respectively shown in the rear substrate 2. However, this is one preferred example, and modifications of the opening position and the number of the openings 5A and 5B can be made as described above.

First, as a means for injecting and discharging the display material 6 into and from the openings 5A and 5B provided in the cell, as shown in FIG. 4A, the means that nozzles 7A and 7B are attached to the openings 5A and 5B respectively is suitable. The nozzles 7A and 7b can be integrated with the substrate and then cut and removed. However, when the nozzles 7A and 7B are temporarily attached only during the filling step, the sealing step can be easily performed. One end of the nozzle 7A is integrally connected to an injector 8 supplying the display material 6 and the other end thereof is inserted in the opening 5B of the rear substrate 2. Further, one end of the nozzle 7B is inserted in the opening 5A of the rear substrate 2, and the other end thereof is connected to a container to receive the discharged display material 6, and in turn to a decompressor such as a vacuum pump. By such a construction, the display material 6 can be effectively injected and discharged into and from the space 4A without being adhered to the outer surface of the cell, particularly circumference of the openings 5A and 5B.

In view of sealing the openings 5A and 5B, it is very important not to spill the display material 6 from the openings 5A and 5B. Even if a small amount of the display material 6 remains, hermetically sealing effect by the adhesive will be lost. That is, when the adhesive contacts with the display material 6, the adhesive is swollen by the organic solvent contained therein, and the adhesion force is lost. In the traditional vacuum injection method, the display material adhered to the opening has been washed. However, sufficiently washing the display material is generally difficult. In particular, in the case of the display material in which a pigment is dispersed with a high viscosity, removing the display material by washing itself has been difficult. Therefore, various methods of sealing the opening have been discussed. Meanwhile, in this embodiment, by using the nozzles 7A and 7B to prevent the display material 6 from being adhered to the surface of the cell, hermetically sealing characteristics of the sealing material is ensured. Further, it is not necessary to remove the display material 6 adhered to the surface of the cell.

Further, here, the display material 6 is pressure-injected from the injector 8 (FIGS. 4A and 4B). Pressure injection can be also performed by introducing inactive gas into the depressurized chamber in, for example, vacuum injection method. However, by attaching one end of the nozzle 7A to the opening 5A and applying pressure from the other end of the nozzle 7A to supply the display material 6, injection at the pressure equal to or more than the normal pressures becomes very easy. This means that the difference between the injection pressure and the inner pressure of the space 4A, that is, the effective pressure to promote injection of the display material 6 can be larger than in the vacuum injection method, and the value of the effective pressure is adjustable.

Further, in this case, it is possible that only the pressure equal to or more than the normal pressures is applied to the display material 6, or it is possible that by using the nozzle 7A, the supply means of the display material 6 is spaced from the opening 5A, and the display material 6 is prevented from being contacted with the depressurized atmosphere. In the result, composition change by volatilization can be avoided. Consequently, even in the case that the filling step is provided for many cells continuously or even in the case that the filling step is provided for a large panel, uniformity of the display material 6 to be injected is maintained as well.

It is possible to depressurize the inside of the space 4A before pressure injection. However, it is most convenient to singly apply the pressure at the ambient pressure. In this case, a sufficient injection pressure can be also obtained. In this case, vacuumization is not necessary, manufacturing steps are simplified, and large facilities such as a chamber is not necessary. Further, in the cell in which film substrates are used, when depressurized in a state that no supporting member is appropriately provided, the substrates tightly stick to each other and the display material is hard to be injected, and therefore vacuum injection is difficult. However, in the method of this embodiment, injection is available without depressurization, and therefore the method of this embodiment can be applied to the cell in which the film substrates are used.

The electrodeposition display panel gives little effect on the product performance by mixed impurities except for some substances such as a radical absorbent. Therefore, a clean facility having a high cleanness, which is necessary for manufacturing the liquid crystal panel is not necessary, and the filling step can be performed under the atmospheric exposure if permissible. Then, differently from the case of the vacuum injection method, the differential pressure equal to or more than the ambient pressure can be given as an injection pressure.

Meanwhile, the opening 5B is used for evacuation of the space 4A at the outset of injection of the display material 6. After the space 4A is filled with the display material 6, the opening 5B is used for discharging the display material 6. Discharging the display material 6 is performed while injecting the display material 6. The space 4A is always in a state that the space being filled with the display material 6. Evacuation and discharge here can be performed by utilizing the injection pressure, or can be performed by positive depressurization from the nozzle 7B. Depressurization timing is set as appropriate. For example, when depressurization is started at the initial time of injection when there is still void in the space 4A (FIG. 4A), the differential pressure applied to the display material 6 becomes large, and filling can be promoted. When this method is adopted, even if the space 4A is not previously depressurized by vacuumization or the like before pressure injection, a large differential pressure can be effectively generated.

By performing pressure injection as above, the filling step, which in the past has taken long time or has been difficult since the viscosity of the display material 6 is high can be performed in a short time. Further, by performing the filling in a short time, deterioration with age of the display material 6 can be inhibited or avoided.

Here, a resin substrate is used as the rear substrate 2 provided with the openings 5A and 5B. Since the resin substrate is easily drilled, and is thicker than the glass substrate is, the resin substrate has the advantage that the nozzles 7A and 7B can be easily fixed when the nozzles 7A and 7B are inserted and attached.

Figure 5:
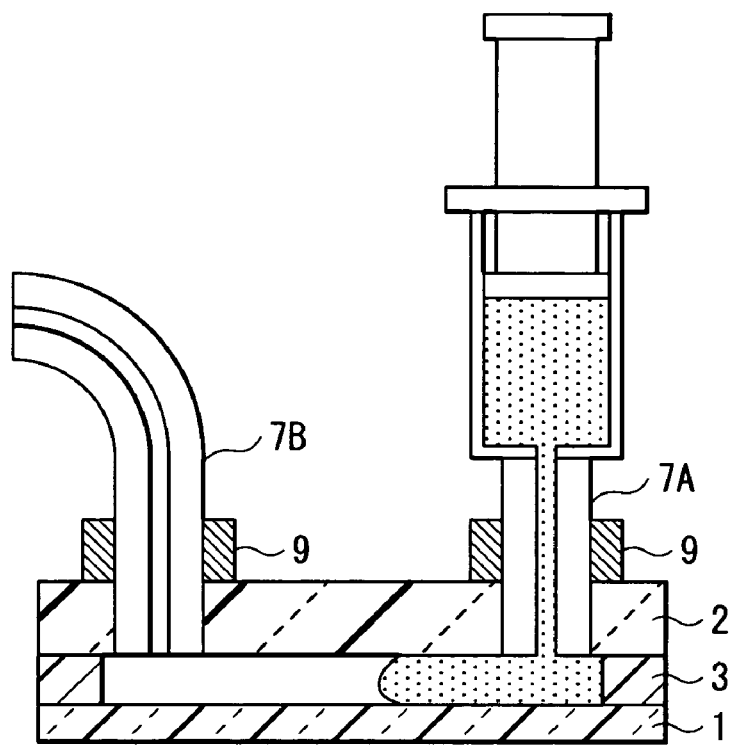
FIG. 5 is a view showing a modification of a nozzle shown in FIGS. 4A and 4B.

As a method of fixing the nozzles 7A and 7B, various methods may be included. For example, as in FIG. 5, a member 9 made of a rubber or the like may be provided at the home of the nozzles 7A and 7B.

Figure 6:
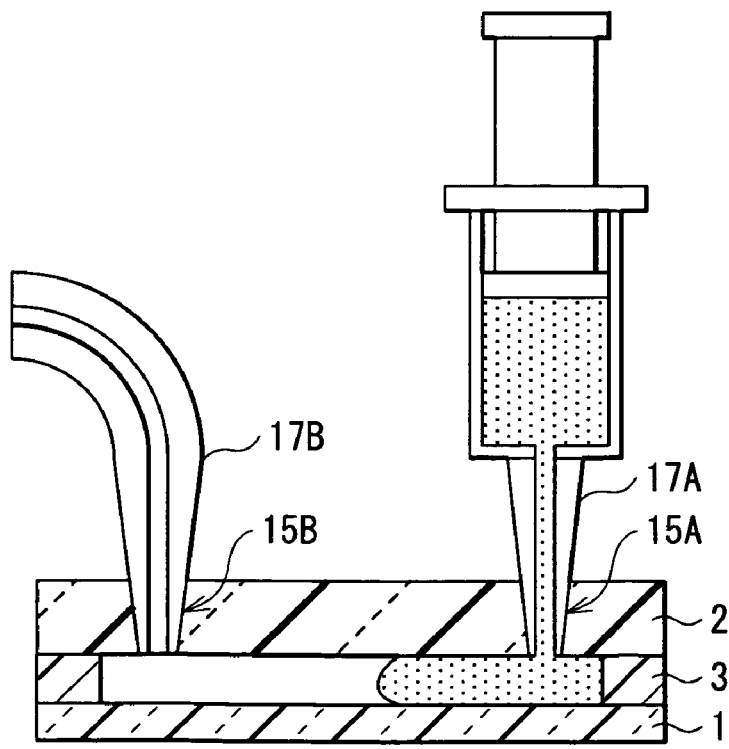
FIG. 6 is a view showing a modification of the nozzle shown in FIGS. 4A and 4B.
Figure 7:
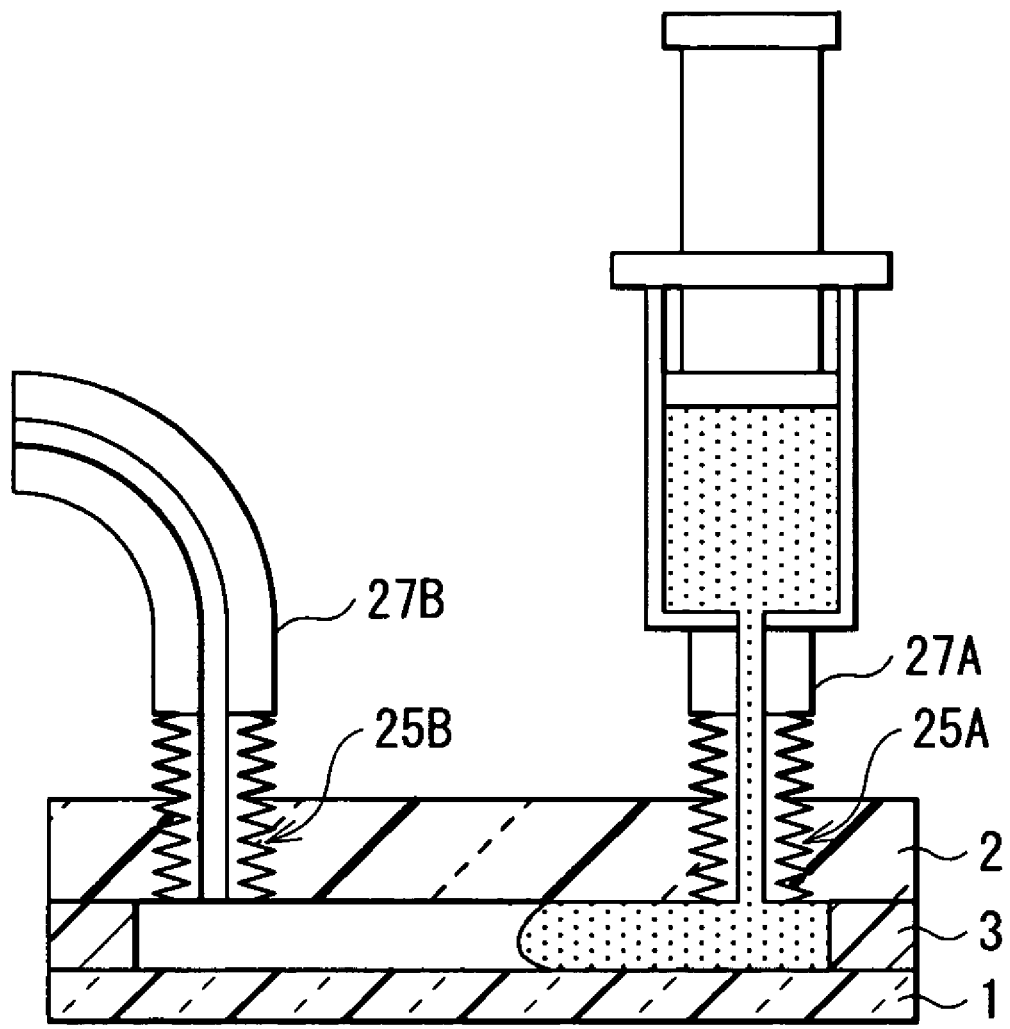
FIG. 7 is a view showing a modification of the nozzle shown in FIGS. 4A and 4B.

Further, though the nozzles 7A and 7B are removable, the connection section between the nozzles 7A, 7B and the openings 5A, 5B should be sealed to the degree that no leak is generated. Therefore, when the inside of the openings 5A and 5B is called the concave section and the end of the nozzles 7A and 7B is called the convex section, it is important that these concave section and convex section correspond to each other. Further, by devising the shape of the connection section, the hermetically sealing degree can be improved. For example, as in FIG. 6, it is preferable that the nozzles 17A and 17B tapered toward the end are inserted and attached to the funnel-shaped openings 15A and 15B. Further, as in FIG. 7, it is preferable that a set of thread part is respectively provided for the inside of the opening 25A and the end of the nozzle 27A, and the inside of the opening 25B and the end of the nozzle 27B, and the nozzles 27A and 27B are screwed in the openings 25A and 25B.

Further, considering leak when the nozzle is removed, as shown in FIGS. 8A and 8B, in addition to the injection path of the display material 6, a nozzle 37A having a branch pipe 37C as the injection path of gas may be attached to the opening 5A on the injection side. Injection and discharge of the display material 6 are performed as usual as in FIG. 8A, but at the final stage thereof, as in FIG. 8B, injection of the display material 6 is stopped, and inactive gas such as nitrogen is sent from the branch pipe 37C, and thereby the display material 6 is pushed out from the nozzle 37A (however, note that the height of the liquid level of the display material 6 pushed by the gas should not be lower than of the face of the rear substrate 2 so that air bubbles are not generated in the position of the opening 5A). Here, the inactive gas such as nitrogen is used for avoiding alteration of the electrolytic solution constituent. If it is only an intention to push out the display material 6, any gas may be used.

Figure 9A:
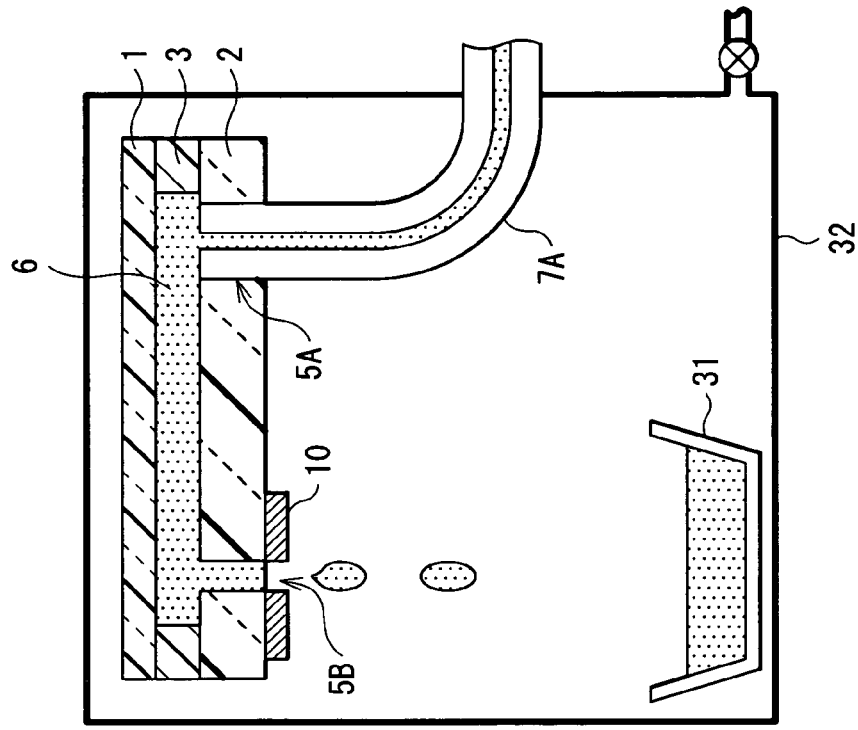
FIGS. 9A and 9B are views showing a modification of the filling method explained in FIGS. 4A and 4B.
Figure 9B:
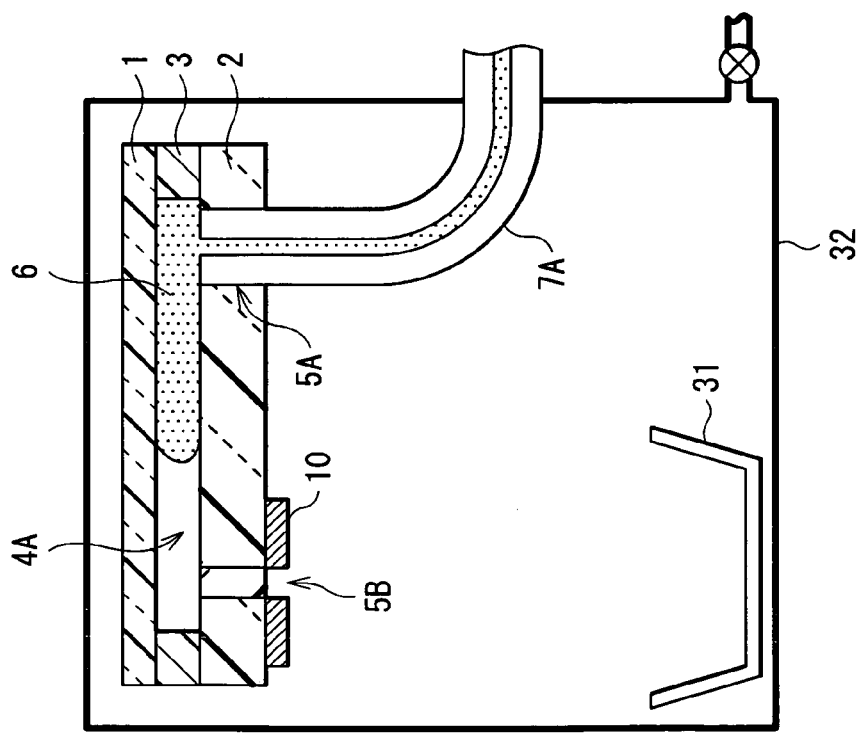

The nozzle may be attached only to one of the openings on the injection side and on the discharge side. FIGS. 9A and 9B show a modification, in which the nozzle 7A is attached to the opening 5A, and the opening 5B is not provided with any nozzle. In this case, when the circumference of the opening 5B on the outer face of the rear substrate 2 is covered with a mask 10 made of a film or the like, the spilled display material 6 can be prevented from being adhered to the surface of the rear substrate 2. Preferably, for example, the mask 10 is previously attached to the opening position of the rear substrate 2, then the rear substrate 2 and the mask 10 are drilled together to form the opening 5B.

Further, in FIGS. 9A and 9B, the cell is set with the rear substrate 2 downward, and a container 31 is arranged under the opening 5B. In this state, the display material 6 discharged from the opening 5B is not spilled on the rear substrate 2, but dropped in the container 31. The display material 6 is thereby prevented from being adhered to the cell as well. The display material 6 recovered into the container 31 is returned to a supply bath (not shown) connected to the nozzle 7A, and utilized. Further, for performing depressurization by direct evacuation from the opening 5B, as shown in FIGS. 9A and 9B, there is a method, in which the cell is accommodated in a depressurization chamber 32 and evacuation is performed together with the ambient air of the cell.

Figure 10:
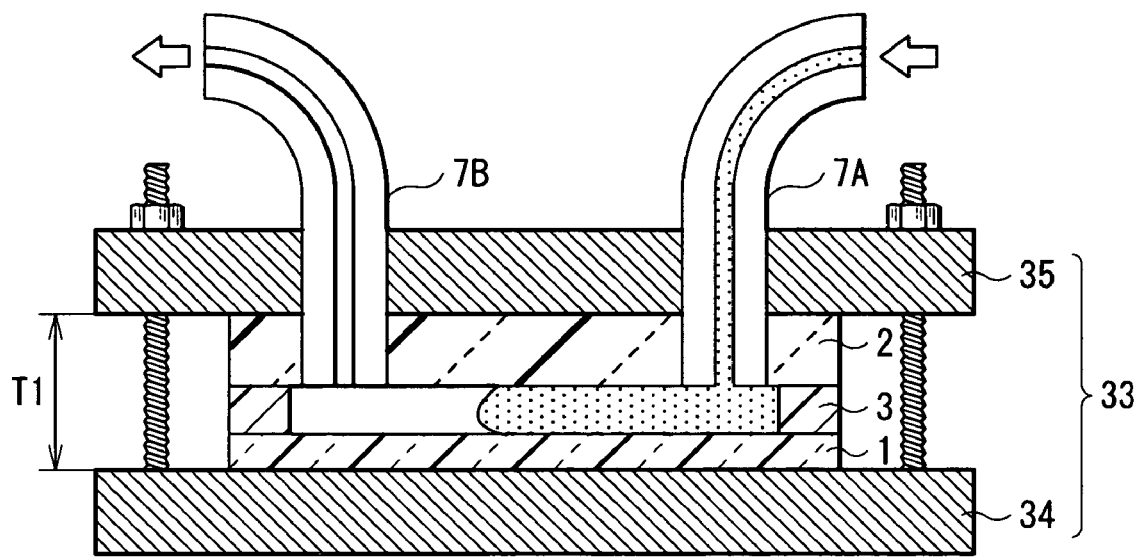
FIG. 10 is a view showing a modification of the filling method explained in FIGS. 4A and 4B.

When the display material 6 is pressure-injected, in the process of filling the display material 6, the force in the direction expanding the gap between the substrates 1 and 2 is applied. When the gap between the substrates 1 and 2 is thereby widened, problems with structural stability as a cell, display characteristics and the like will arise. Therefore, in the filling step, as shown in FIG. 10, a cell thickness T1 is preferably fixed by using a jig 33. The jig 33 includes a pair of supporting plates 34 and 35 having a flat face. The cell is sandwiched so that the outer faces of the substrates 1 and 2 are laid along these flat faces, and then the cell is caulked with, for example, a threaded rod and a fastener. It is enough that the supporting plates 34 and 35 press at least the region of the space 4A to which a pressure is applied during filling. If the cell is pressed from the both faces as above, the cell thickness T1 can be fixed.

The nozzles 7A and 7B attached to the rear substrate 2 may be provided independently from the jig 33, but may be integrated with the supporting plate 35, by which the step of attaching the nozzles can be simplified. The supporting plate 35 is desirable transparent to visually check the openings 5A and 5B, and can be integrally molded with the nozzles 7A and 7B by a transparent resin.

Filling the display material 6 by fixing the both faces of the cell as above is very effective in order to inhibit deformation of the substrate and maintain the cell thickness uniform, particularly in the case that a flexible substrate such as a film is used as at least one of the substrates 1 and 2.

Figure 11:
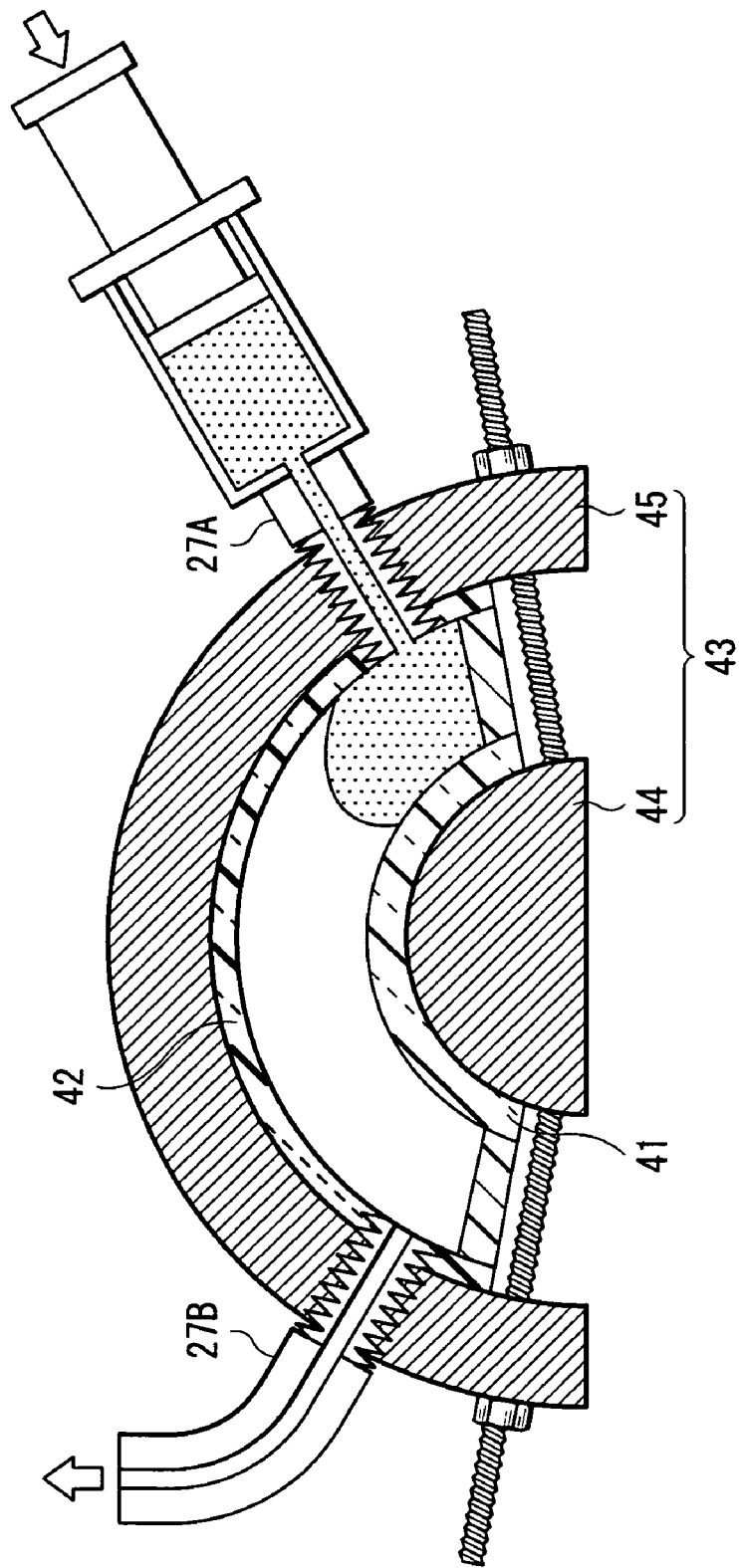
FIG. 11 is a view showing a modification of the filling method explained in FIGS. 4A and 4B.

Further, in the case that the substrates have a curved face, by fixing the substrates as in FIG. 11, the gap inbetween can be maintained constant even if the foregoing expansion force is locally applied. In FIG. 11, substrates 41 and 42 are curved so that the cross section of the cell is fan-shaped. The substrates 41 and 42 are laid on the fixing faces of supporting bodies 44 and 45 and sandwiched between the supporting bodies 44 and 45. By preparing a jig 43 corresponding to the shape of the substrate as above, the cell thickness can be maintained uniform while the cell shape is maintained.

After the display material 6 is filled as above, the nozzles are removed, or the mask is peeled and removed, and then the openings are sealed.

Figure 12:
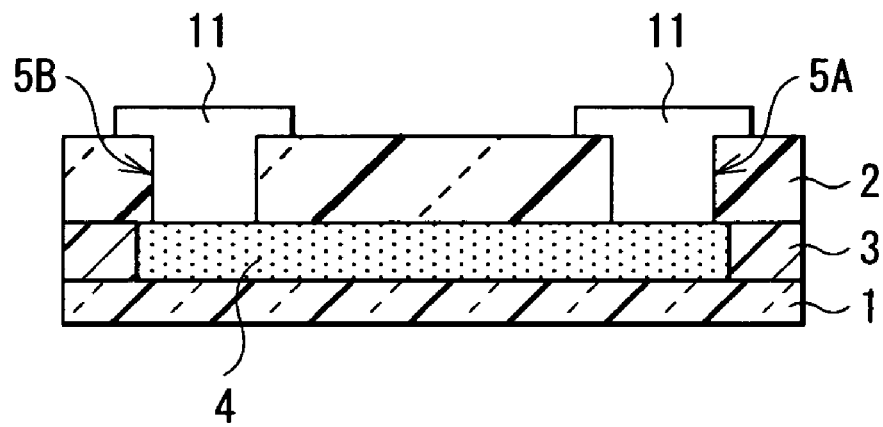
FIG. 12 is a view showing a step of sealing the opening following FIGS. 4A and 4B.
Figure 13:
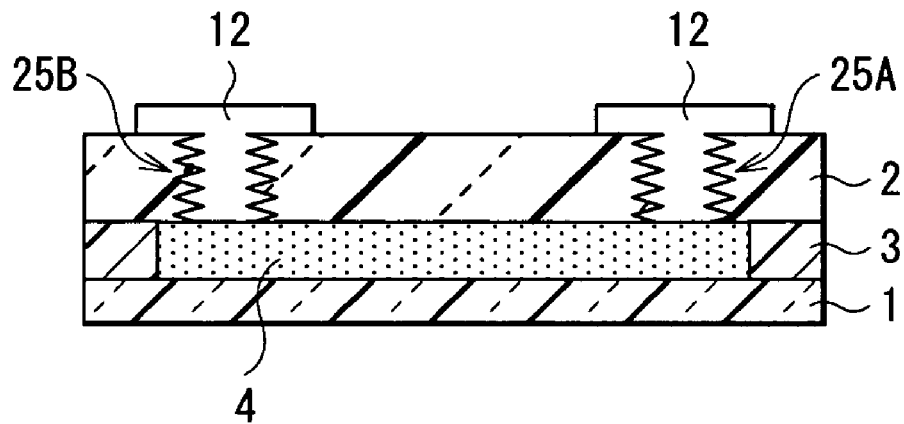
FIG. 13 is a view showing a modification of the sealing method shown in FIG. 12.

Here, the sealing method is not particularly limited, but as a sealing material, at least the material resistant to the display material 6 should be selected. Specifically, for example, the following sealing mode is thinkable. In FIG. 12, the openings (here openings 5A and 5B) are sealed by shoving in a convex tap 11. The tap 11 is made by molding plastics according to the shape of the opening and the thickness of the rear substrate 2. Thereby, the filled display material 6 is hermetically sealed in the cell as the electrolyte layer 4. Further, as in FIG. 13, for the openings 25A and 25B provided with a thread inside, sealing can be made by tucking the tap 12 provided with a similar thread.

Figure 14:
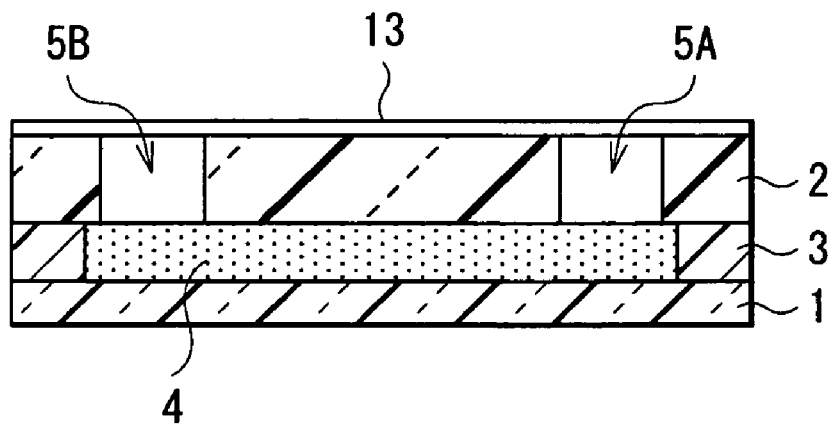
FIG. 14 is a view showing a modification of the sealing method shown in FIG. 12.

Further, as in FIG. 14, a film 13 may be contacted on the whole face of the rear substrate 2 provided with the openings. The material of the film 13 is not particularly limited, but the material with characteristics tolerant to the electrolytic solution is desirable. Further, if affixed to the transparent substrate 1 on the display face side, the film 13 should be transparent. However, if affixed to the rear substrate 2, the film 13 is not necessarily transparent. For example, it is possible to use a multilayer film given barrier characteristics by providing a polyethylene hot melt adhesive on the substrate side, and providing an aluminum thin film on the outer face side. Thereby, it can be expected that permeation of the display material 6 becomes significantly small, leading to superior sealing effect. In this method, the film 13 and the rear substrate 2 should be sufficiently contacted. However, the method can be applied regardless of the shape and the number of the openings. Further, the method is a very convenient method. In particular, the method is effective when a plurality of openings provided on the same substrate face are sealed once.

Figure 15:
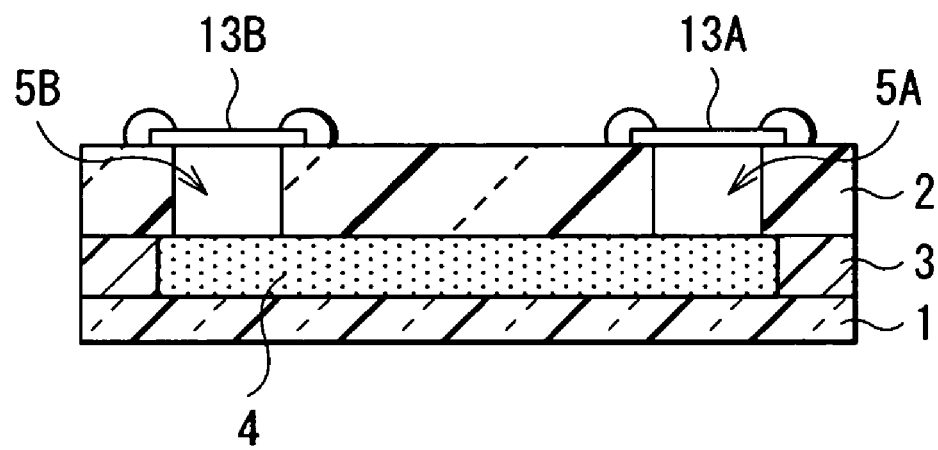
FIG. 15 is a view showing a modification of the sealing method shown in FIG. 12.

Further, as in FIG. 15, it is possible that a film 13A is arranged only on the top face and the circumference of the openings (here openings 15A and 15B) on the rear substrate 2, and further an adhesive is contacted on the film 13A and to the edge thereof.

Figure 16:
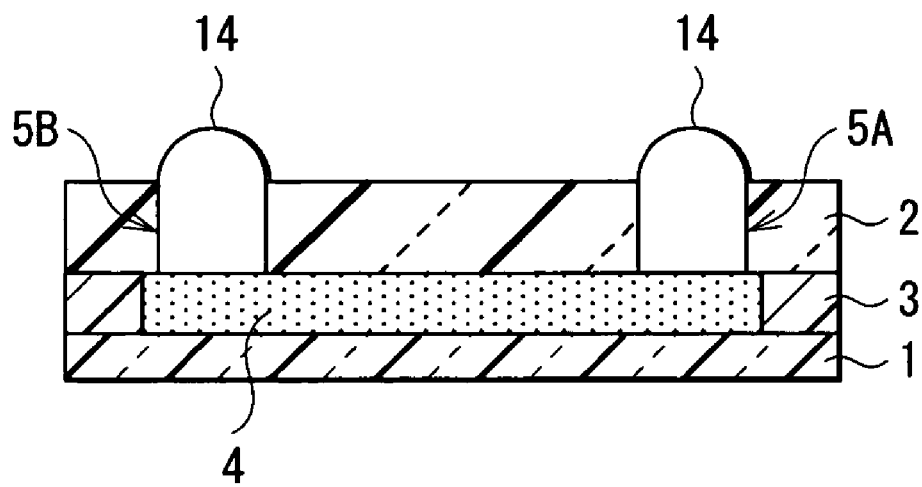
FIG. 16 is a view showing a modification of the sealing method shown in FIG. 12.

Further, as shown in FIG. 16, there is a method, in which as a sealing material 14, an adhesive or the like is filled inside the openings (here openings 5A and 5B) to perform sealing. In addition to the adhesive, the sealing material 14 can be formed by using a molten thermoplastic resin, which is cooled and solidified after being filled. Otherwise, the sealing material 14 can be formed by using a monomer or an oligomer of a thermosetting resin, which is heat-cured after being filled. Further, a method, in which a photo polymerization resin is used, which is filled, and then cured by irradiating active energy line such as ultraviolet rays can be utilized. Furthermore, a method, in which a wet cured resin is used, which is cured in the atmosphere can be utilized.

In order to improve sealing capacity by these sealing materials, or in order to prevent direct contact between the sealing material and the display material 6 or permeation of the display material 6 from the gap of the sealing material, a small amount of resins including a fluorocarbon resin and a silicon resin, an adhesive, a grease or the like may exist between the sealing material and the display material 6, or between the sealing material and the opening. As a material for the sealing material, in addition to resins, any material such as a metal, glass, and ceramics can be used.

After the openings are sealed, the display material 6 filled according to needs is gelated. The display material 6 can be gelated by, for example, irradiating active energy line such as ultraviolet rays and heating.

As above, the electrodeposition display panel according to this embodiment is manufactured. Therefore, the electrolyte layer 4 has a uniform composition by injection and discharge of the display material 6 through the openings. Further, the rear substrate 2 is provided with, for example, the sealing material as described above, which seals the opening. Further, when the nozzle is attached to the opening in the filling step, the internal shape of the opening corresponds to the shape of the end of the nozzle. When the nozzle is attached, or when the circumference of the opening is covered with the mask, the display material 6 is prevented from being adhered to the outer surface of the cell, decrease in contact characteristics of the sealing material is avoided, and a highly reliable display panel can be obtained.

The electrodeposition display device of this embodiment is manufactured by connecting the electrodes drawn from this display panel (electrodes provided with the substrates 1 and 2) to the driving control circuit and integrally assembling the components.

As above, according to this embodiment, the electrodeposition display panel is manufactured through the cell formation step for forming the vacant cell provided with the openings 5A and 5B, through which the inside and the outside are connected, and the filling step for filling the display material 6 in the cell by injecting the display material 6 in the cell through the opening 5A while performing evacuation of the cell and discharging the injected display material 6 through the opening 5B. Therefore, the display material 6 can be immediately filled and necessary time for manufacturing the panel can be significantly shortened. The filling step can be performed by pressurizing the opening 5A under atmospheric exposure. In this case, the step can be significantly simplified.

Further, since depressurization is not necessary, volatilization of the display material 6 can be avoided, the composition alteration can be prevented, and filling into the cell using the film substrate becomes available. Further, by performing evacuation of the cell and discharging the display material 6 on the opening 5B side under depressurization, a large differential pressure is generated in the cell, and the filling step can be performed in a shorter time.

Further, by performing the filling in a shorter time, deterioration with age of the display material 6 and separation of the display material 6 in the cell can be inhibited or avoided, and the display quality of the display panel to be manufactured can be maintained.

Further, in this filling step, of the filled display material 6, the portion mixed with air bubbles is discharged, and the portion which is not uniform due to separation of constituents is flowed and discharged. Therefore, the display material 6 is uniformly filled in the cell. Consequently, the electrodeposition display panel with high display quality can be manufactured.

Further, here, the rear substrate 2 is provided with the openings 5A and 5B. Therefore, sealing can be performed easily and surely.

Further, the nozzle 7A is attached to the opening 5A, and the nozzle 7B is attached to the opening 5B, respectively. Therefore, the display material 6 can be injected and discharged with no display material 6 adhered to the circumference of the openings 5A and 5B. Therefore, the openings 5A and 5B can be surely sealed, and a highly reliable display panel can be manufactured. Concurrently, by supplying the display material 6 through the nozzle 7A to the opening 5A, the injection pressure of the display material 6 can be decided independently of the outside air pressure around the cell. Therefore, the display material 6 can be pressure-injected at a given pressure, an injection pressure larger than in the vacuum injection method can be obtained by using the normal pressures or more, and injection and discharge can be performed effectively. Meanwhile, by attaching the nozzle 7B on the opening 5B side, evacuation of the cell, discharge of the display material 6, and recovery of the spilled display material 6 can be effectively performed. Further, evacuation and discharge under depressurization are also effectively performed with a simple unit construction.

[Modification]

In the foregoing embodiment, the method for immediately filling the display material 6 with a high viscosity in the space 4A has been described. This filling method can be effectively applied not only to the case that injection is delayed since the viscosity of the display material 6 is large, but also to the case where an injection resistance is high for some reason and therefore injection is difficult. As one example thereof, the case where the substrate is provided with surface treatment will be hereinafter described. In this modification, similar components to of the foregoing embodiment will be given similar reference symbols, and the description thereof will be omitted as appropriate.

In the electrodeposition display panel of the foregoing embodiment, in the case that the electrolyte layer 4 is obtained by gelating the display material 6, if the electrolyte layer 4 is separated from the transparent substrate 1, which is the substrate on the metal deposition side due to impact from the outside or expansion and shrinkage of the electrolyte layer 4, electrode reaction cannot be promoted at the separated section, and display operation may be in trouble. To avoid such a trouble, it is preferable to provide a separation preventive layer 50 between the transparent substrate 1 and the electrolyte layer 4 to prevent the electrolyte layer 4 from being separated from the transparent substrate 1.

The separation preventive layer 50 is intended to improve contact characteristics between the electrolyte layer 4 and the transparent substrate 1, and is formed by providing surface treatment on the electrode face side of the transparent substrate 1. The surface treatment is performed before the vacant cell is assembled. As a substrate treatment agent used then, a silane coupling agent, a sylyl agent, a titanate coupling agent, an aluminate coupling agent, a zirconium aluminum coupling agent, an unsaturated fatty acid, oils and fats, a nonionic surface active agent, wax, a carboxylic coupling agent, and a phosphate coupling agent or the like can be utilized. These surface treatment agents can be used by being dissolved in a solvent as appropriate. These surface treatment agents can be utilized by directly coating the substrate, or can be utilized by after coating the substrate, heating and drying the agent to form bonding with the substrate surface.

Figure 17:
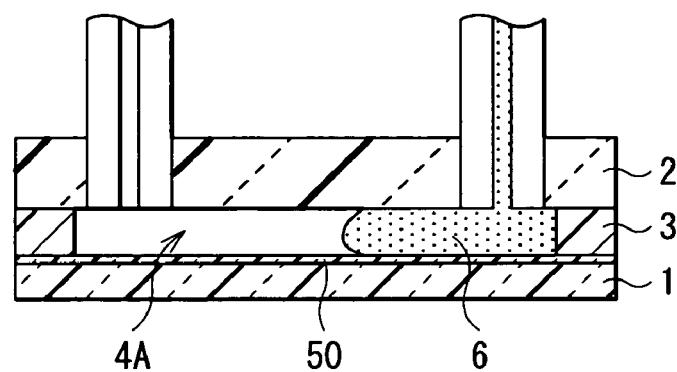
FIG. 17 is an explanation drawing of an electrodeposition display panel and a manufacturing method thereof according to a modification of the embodiment of the present invention.

Therefore, in this modification, the separation preventive layer 50 is formed on the surface of the transparent substrate 1 of the space 4A of the vacant cell. When the display material 6 is injected in the space 4A (FIG. 17), injection rate of the display material 6 is decreased by the resistance generated with the separation preventive layer 50. This state can be resolved by further increasing the injection pressure, and thereby the injection efficiency can be maintained.

Next, specific examples, to which the present invention is applied will be described. In the following examples, descriptions will be given by giving the same reference symbols as of the embodiment for the components similar to of the foregoing embodiment.

Example 1

Respective mixing amounts of the following constituents were dissolved in dimethyl sulfoxide to prepare an electrolytic solution.

Silver iodide: 500 mmol/l
Sodium iodide: 750 mmol/l
Triethanolamine: 67 mmol/l
Coumarin: 5 g/l
2-Mercaptobenziimidazole: 5 g/l Into the foregoing electrolytic solution, a fifth weight resin liquid, TA-140 (manufactured by Dai-ichi Kogyo Seiyaku Co., Ltd.) was mixed to prepare an electrolytic solution. As a white pigment, titanium oxide, JR-805 (manufactured by Titan Kogyo K.K.) being weighing equal to the electrolytic solution was added to the electrolytic solution, and dispersed by a homogenizer. The resultant was accommodated in a desiccator, depressurized by an oil diffusion pump until when bubbles were not produced from the electrolytic solution in which the pigment was dispersed. To the resultant, an organic oxide, Perocta O (manufactured by NOF Corporation) was added at a ratio of 2 wt % of the resin solution, which was lightly stirred so that air bubbles were prevented from being produced to obtain the display material 6. When the viscosity of the display material 6 was measured by a rotating viscometer (manufactured by Toki Sangyo, Model RE 550), the viscosity was 23,000 mPa·s (rotor frequency: 0.5 rpm).

Figure 3A:
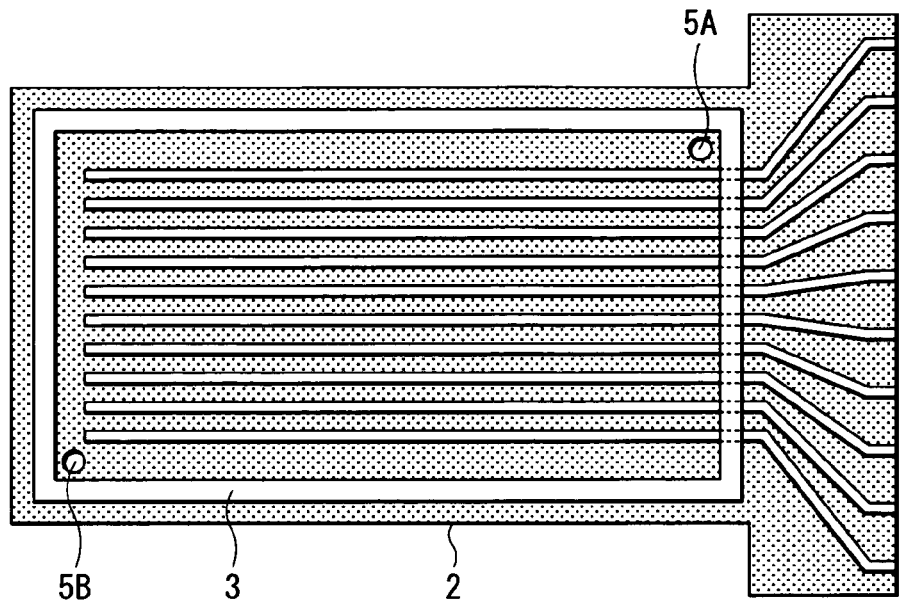
FIGS. 3A and 3B are views showing steps of fabricating a cell in the manufacturing method explained in FIGS. 1A and 1B.
Figure 3B:
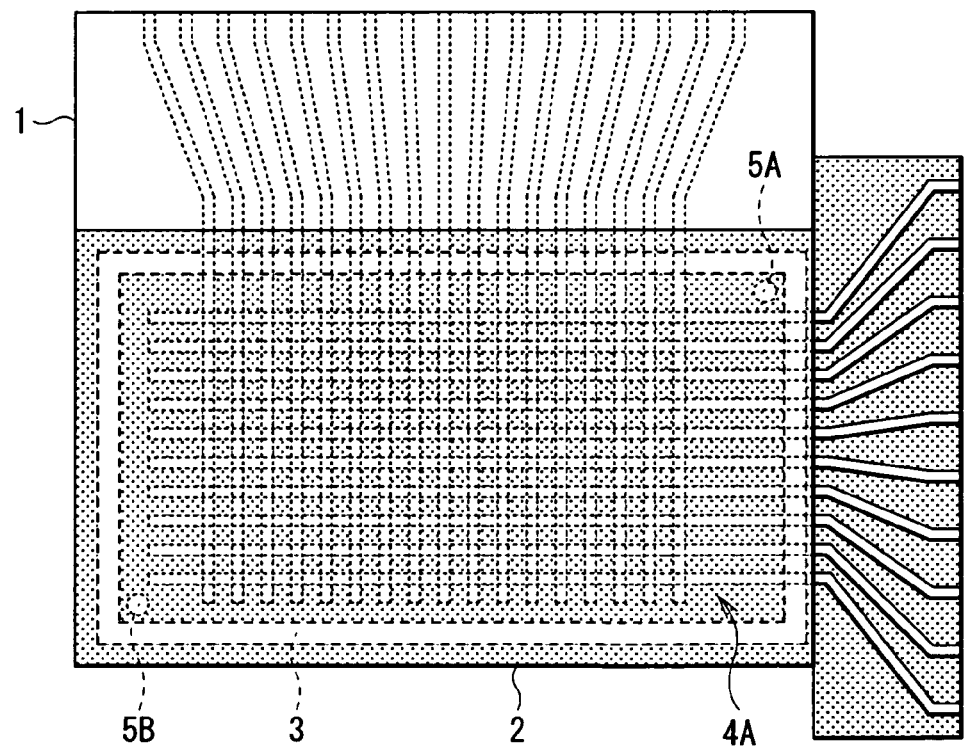

In the opposing corners of a glass epoxy substrate provided with a silver electrode (rear substrate 2), the circular opening 5A being 4.0 mm in diameter and the circular opening 5B being 2.0 mm in diameter were drilled. A film type hot melt adhesive 3 (manufactured by Aichi plastics Kogyo) being 55 μm thick, which was stamped being 70×90 $mm^2$ and 5 mm wide in accordance with the edge of the substrate was laid. Then, the opening 5A and the opening 5B were located inside the film type hot melt adhesive 3 and outside the portion to become pixels (FIG. 3A). The film type hot melt adhesive 3 also functions as a spacer between the two substrates. A glass substrate provided with an ITO electrode being 90×90 mm$^2$ (transparent electrode substrate 1) was laid, and thermocompression bonding was performed under the conditions of 140 deg C., 0.2 MPa, and 10 sec to fabricate a cell (FIG. 3B).

The display material 6 was sucked in a 10 ml injector made of polypropylene attached with a nozzle, and the nozzle was inserted into the opening 5A with no gap. Further, a tube made of polyethylene (outer diameter: 2.0 mm, inner diameter: 1.0 mm) was inserted into the opening 5B without gap. In this state, the display material 6 was injected into the cell by pressing the piston of the injector. Injection was stopped when the display material 6 was filled all over the cell, and air bubbles mixed in the display material 6 in the process of injection were discharged together with the display material 6 from the opening 5B. The cell was sandwiched between glass plates, pressurized until the thickness of the central part of the cell became the same as of the edge thereof to flow out the display material 6 from the opening 5B.

After the injector of the opening 5A and the tube of the opening 5B were removed, the opening 5A and the opening 5B were simply sealed by cellophane tape. A polypropylene sheet coated with an epoxy adhesive (manufactured by Ciba Geigy Ltd., trade name: Araldite) was affixed to the whole area of the substrate provided with the opening 5A and the opening 5B. The resultant was heated in an oven at 100 deg C. for 10 minutes to harden the display material 6 filled in the cell and the epoxy adhesive of the sheet affixed to the substrate. The resultant was provided with electric wiring to obtain a display.

Example 2

A PET film 51 was affixed to the whole rear face of the glass epoxy substrate (rear substrate 2), which is the same as used in Example 1. As an adhesive, a synthetic rubber spray glue (manufactured by Sumitomo 3M Ltd.) was used. As in Example 1, in the opposing corners of the substrate 2, the circular opening 5A being 4.0 mm in diameter and the circular opening 5B being 2.0 mm in diameter were drilled. The film type hot melt adhesive 3 and the transparent electrode substrate 1, both of which are the same as used in Example 1 were used to assemble a cell.

Figure 18:
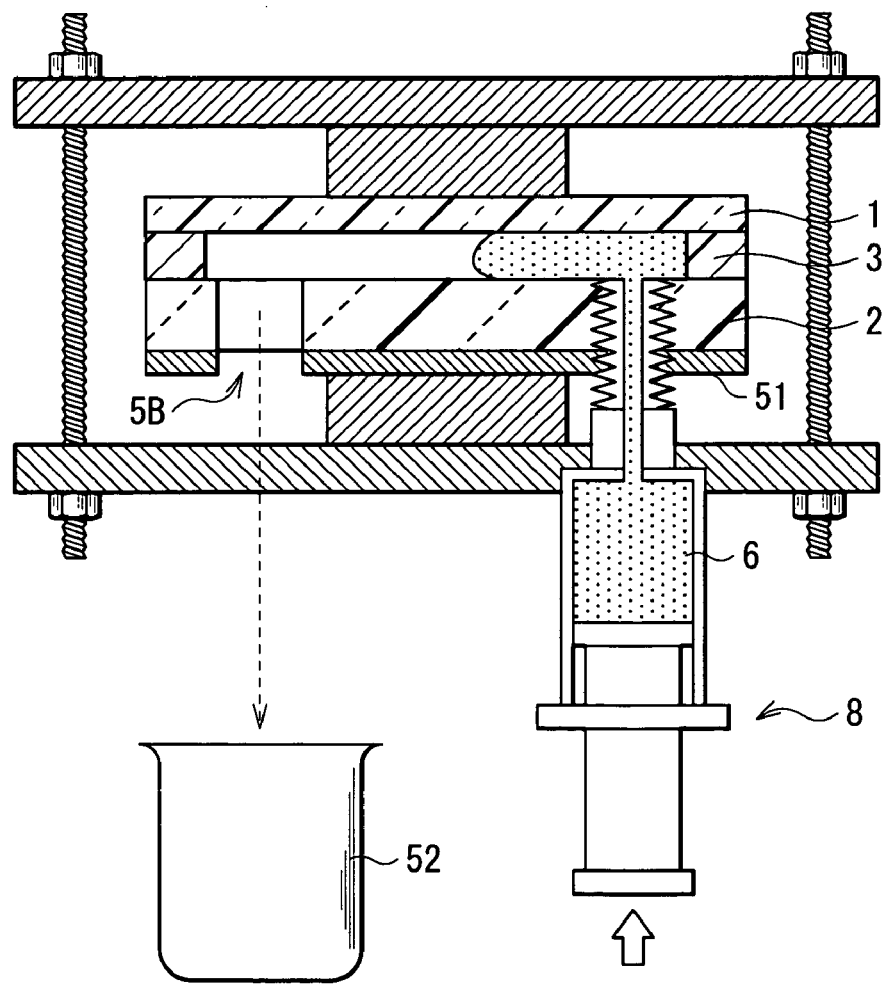
FIG. 18 is an explanation drawing of a method of manufacturing an electrodeposition display panel according to an example of the present invention.

The display material 6 was sucked in the 10 ml injector 8 made of polypropylene, to which a threaded nozzle was connected, and the nozzle was screwed in the opening 5A. The inside of the opening 5A and the opening 5B was sandwiched by using acrylic plates being 1 cm thick from the both sides of the cell. The cell was fixed by a clamp with the glass epoxy substrate 2 to which the injector 8 was connected held downward and the transparent electrode substrate 1 held upward (FIG. 18). In this state, the piston of the injector was pressed, and the display material 6, the same as used in Example 1 was injected into the cell. The display material 6 was expanded inside the cell. The display material 6 spilled from the opening 5B was received by a beaker 52. Injection was stopped when the display material 6 was filled all over the cell, and air bubbles mixed in the display material 6 in the process of injection were discharged together with the display material 6 from the opening 5B.

After the PET film 51 affixed to the glass epoxy substrate 2 was separated, the openings 5A and 5B were screwed by a polypropylene screw having the same gauge as of the openings 5A and 5B. Then, the screw was coated with a silicon grease (manufactured by Toray Dow Corning Silicone). The resultant was heated in an oven at 100 deg C. for 10 minutes to harden the display material 6 filled in the cell. The resultant was provided with electric wiring to obtain a display.

Example 3

In the opposing corners of the glass epoxy substrate (rear substrate 2), the same as used in Example 1, the circular opening 5A being 4.0 mm in diameter and the circular opening 5B being 2.0 mm in diameter were screw-cut and drilled. The film type hot melt adhesive 3 and the transparent electrode substrate 1, the same as used in Example 1 were used to assemble the cell.

The display material 6 was sucked in the 10 ml injector 8 made of polypropylene to which a threaded nozzle was connected, and the nozzle was screwed in the opening 5A. Of the both faces of the cell, the inside of the opening 5A and the opening 5B was sandwiched by using acrylic plates being 1 cm thick. The cell was fixed by a clamp with the glass epoxy substrate 2 to which the injector 8 was connected held downward and the transparent electrode substrate 1 held upward. The opening 5B was connected to a diaphragm pump through a polyethylene tube whose end was screw-cut in the same gauge as of the opening 5B. While depressurization is performed from the opening 5B, the piston of the injector 8 connected to the opening 5A was pressed, and the display material 6, the same as used in Example 1 was injected into the cell. Then, in order to prevent a constant flow from being formed in the display material 6 in the cell, the injector was pressed more strongly than in Example 1 to inject more display material 6 per unit time. Injection was stopped when the display material 6 was filled all over the cell, and air bubbles mixed in the display material 6 in the process of injection were discharged together with the display material 6 from the opening 5B.

After the PET film 51 affixed to the glass epoxy substrate 2 was separated, the opening 5A and the opening 5B were screwed by a polypropylene screw respectively having the same gauge as of the opening 5A and the opening 5B. Then, the screw was coated with a silicon grease (manufactured by Toray Dow Corning Silicone). The resultant was heated in an oven at 100 deg C. for 10 minutes to harden the display material 6 filled in the cell. The resultant was provided with electric wiring to obtain a display.

Example 4

In the same mixed solution as used in Example 1, a non-ionic surface active agent, Nonion NS-202 (manufactured by NOF Corporation) was added at a ratio of 0.5 wt % of the mixed solution. A fifth weight resin solution, TA-140 (manufactured by Dai-ichi Kogyo Seiyaku Co., Ltd.) was mixed thereto to prepare an electrolytic solution. As a white pigment, titanium oxide, JR-805 (manufactured by Titan Kogyo K.K.) being weighing equal to the electrolytic solution was added to the electrolytic solution, and dispersed by a homogenizer. The resultant was accommodated in a desiccator, depressurized by an oil diffusion pump until when bubbles were not produced from the electrolytic solution in which the pigment was dispersed. To the resultant, an organic oxide, Perocta O (manufactured by NOF Corporation) was added at a ratio of 2 wt % of the resin solution, which was lightly stirred so that air bubbles were prevented from being produced to obtain the display material 6. When the viscosity of the display material 6 was measured by a rotating viscometer (manufactured by Toki Sangyo, Model RE 550), the viscosity was 22,000 mPa·s (rotor frequency: 0.5 rpm).

In the opposing corners of the same glass epoxy substrate (rear substrate 2) as used in Example 1, the circular opening 5A being 2.0 mm in diameter and the circular opening 5B being 2.0 mm in diameter were drilled. The electrode face side of the transparent substrate 1 was coated with Silane coupling agent 50 (manufactured by Shin-Etsu Chemical Co., Ltd., KBM-703) by using a spin coater (firstly 1000 rpm·25 sec, and then 5000 rpm·5 sec). The same film type hot melt adhesive 3 as used in Example 1 was used to assemble a cell.

Figure 19A:
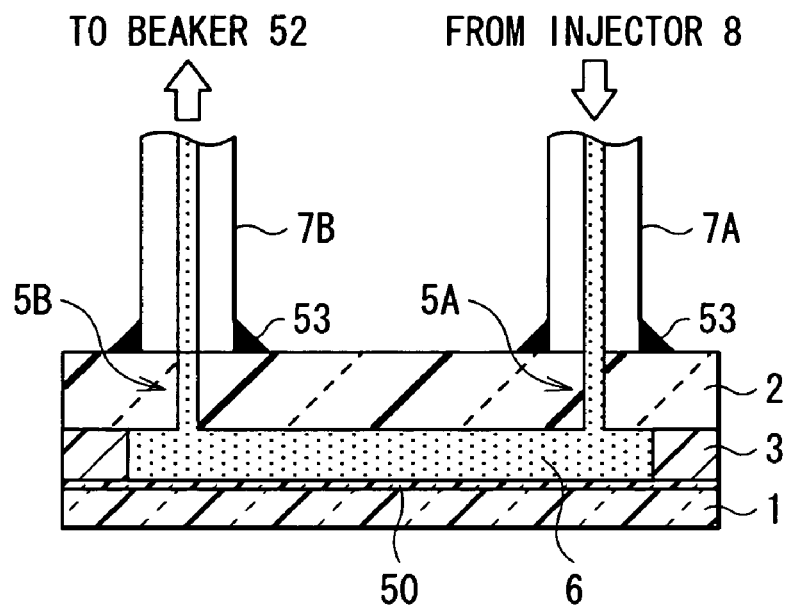
FIGS. 19A to 19C are explanation drawings of a method of manufacturing an electrodeposition display panel according to an example of the present invention.

A polyethylene tube 7A having an outer diameter of 4.0 mm and an inner diameter of 3.0 mm was connected to the opening 5A of the glass epoxy substrate 2, and the circumference of the joint section was bonded by an epoxy adhesive 53 (manufactured by Ciba Geigy Ltd., trade name: Araldite). Similarly, the same type polyethylene tube was connected to the opening 5B, and the joint section was bonded by the epoxy adhesive 53 (FIG. 19A). Of the both faces of the cell, the inside of the opening 5A and the opening 5B was sandwiched by using acrylic plates being 1 cm thick. The cell was fixed by a clamp with the glass epoxy substrate to which the injector was connected held downward and the transparent electrode substrate held upward. The display material 6 was sucked in the 10 ml injector 8 made of polypropylene, and the display material 6 was injected from the other end of the polyethylene tube 7A connected to the opening 5A. After the display material 6 was filled in the cell, injection was continued. The display material 6 containing air bubbles mixed in the process of injection was received by the beaker 52 through a polyethylene tube 7B connected to the opening 5B. Injection was stopped when there was no air bubbles in the cell.

Figure 19B:
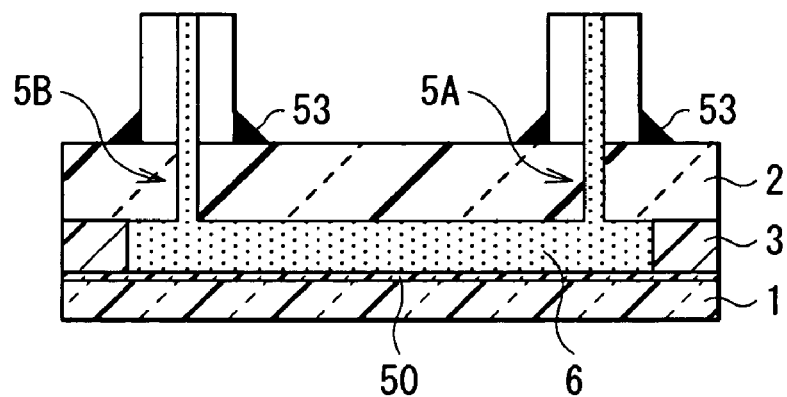
Figure 19C:
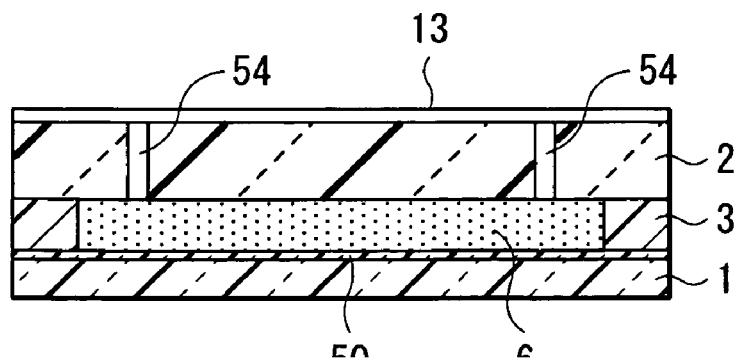

The polyethylene tubes 7A and 7B adhered to the opening 5A and the opening 5B were cut to the length of about 2 to 3 cm from the glass epoxy substrate 2, the clamp was removed, and the cell was taken out (FIG. 19B). The resultant was heated in an oven at 100 deg C. for 10 minutes to harden the display material 6 filled in the cell. The polyethylene tubes 7A and 7B connected to the opening 5A and the opening 5B were removed from the glass epoxy substrate, the concave section generated in the opening 5A and the opening 5B was sealed by being filled with a silicon grease 54 (manufactured by Toray Dow Corning Silicone). An aluminum face of an aluminum-vapor deposition PET film was coated with an epoxy adhesive (manufactured by Ciba Geigy Ltd., trade name: Araldite), which was affixed to the whole face of the glass epoxy substrate 2 to obtain a sealing film 13 (FIG. 19C). When the display material 6 was hardened, electric wiring was provided to obtain a display.

Example 5

A dispersing agent, Tayca power BC 2070M (manufactured by Tayca Corporation) was added to the same mixed solution as used in Example 1 at a ratio of 2 wt % of the mixed solution. Into the foregoing solution, a fifth weight resin solution, TA-140 (manufactured by Dai-ichi Kogyo Seiyaku Co., Ltd.) was mixed to prepare an electrolytic solution. As a white pigment, titanium oxide, JR-805 (manufactured by Titan Kogyo K.K.) being weighing equal to the electrolytic solution was added to the electrolytic solution, and dispersed by a homogenizer. The resultant was accommodated in a desiccator, depressurized by an oil diffusion pump until when bubbles were not produced from the electrolytic solution in which the pigment was dispersed. To the resultant, an organic oxide, Perocta O (manufactured by NOF Corporation) was added at a ratio of 2 wt % of the resin solution, which was lightly stirred so that air bubbles were prevented from being produced to obtain the display material 6. When the viscosity of the display material 6 was measured by a rotating viscometer (manufactured by Toki Sangyo, Model RE 550), the viscosity was 16,128 mPa·s (rotor frequency: 0.5 rpm).

Figure 20:
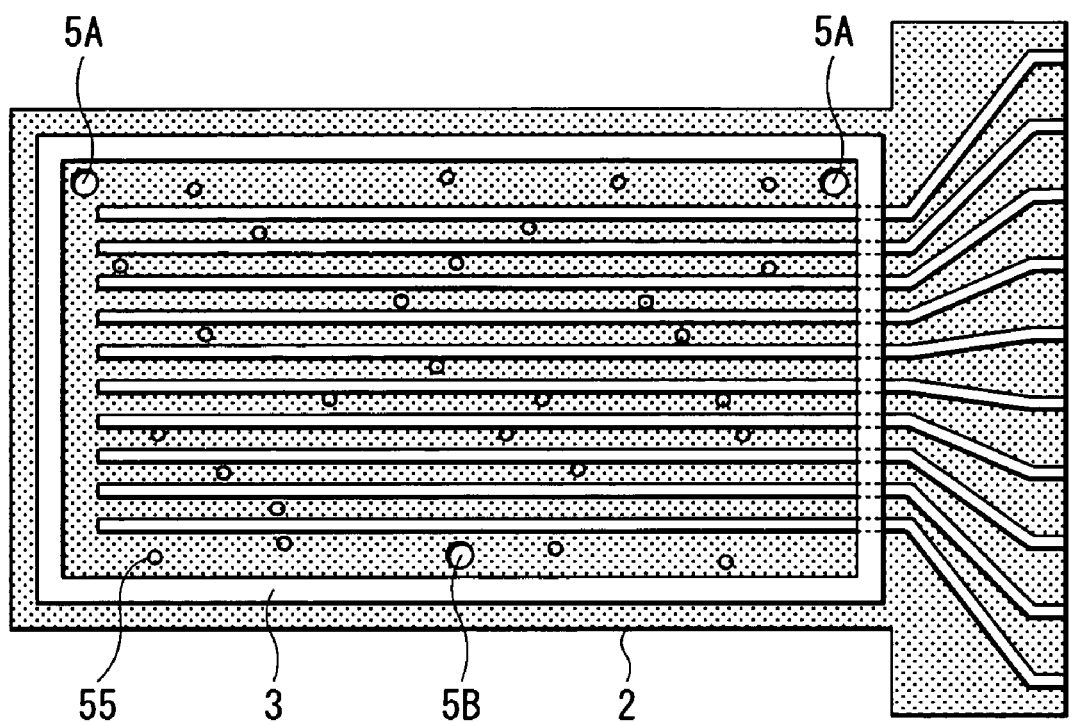
FIG. 20 is an explanation drawing of a method of manufacturing an electrodeposition display panel according to an example of the present invention.

A Zeonoa film substrate having a film thickness of 200 μm (manufactured by Nippon Zeon) was provided with a silver electrode to obtain the rear substrate 2. On a long side of this substrate, two circular openings 5A being 4.0 mm in diameter were drilled. In the center of the other long side of the substrate, the circular opening 5B being 2.0 mm in diameter was drilled (FIG. 20). Next, the film type hot melt adhesive 3 (manufactured by Aichi plastics Kogyo) being 55 μm thick, which was stamped being 70×90 mm² and 5 mm wide in accordance with the edge of the substrate 2 was laid. Then, the opening 5A and the opening 5B are located inside the film type hot melt adhesive 3 and outside the portion to become pixels. The film type hot melt adhesive 3 also functions as a spacer between the two substrates. Next, in the section to become pixels inside the film type hot melt adhesive 3, glass beads 55 being 50 μm in diameter were dispersed as a spacer. Further, as the transparent substrate 1, a Zeonoa film substrate provided with an ITO electrode being 90×90 mm² (film thickness of the film portion: 200 μm) was laid, and thermocompression bonding was performed under the conditions of 140 deg C., 0.2 MPa, and 10 sec to fabricate a cell.

Figure 21:
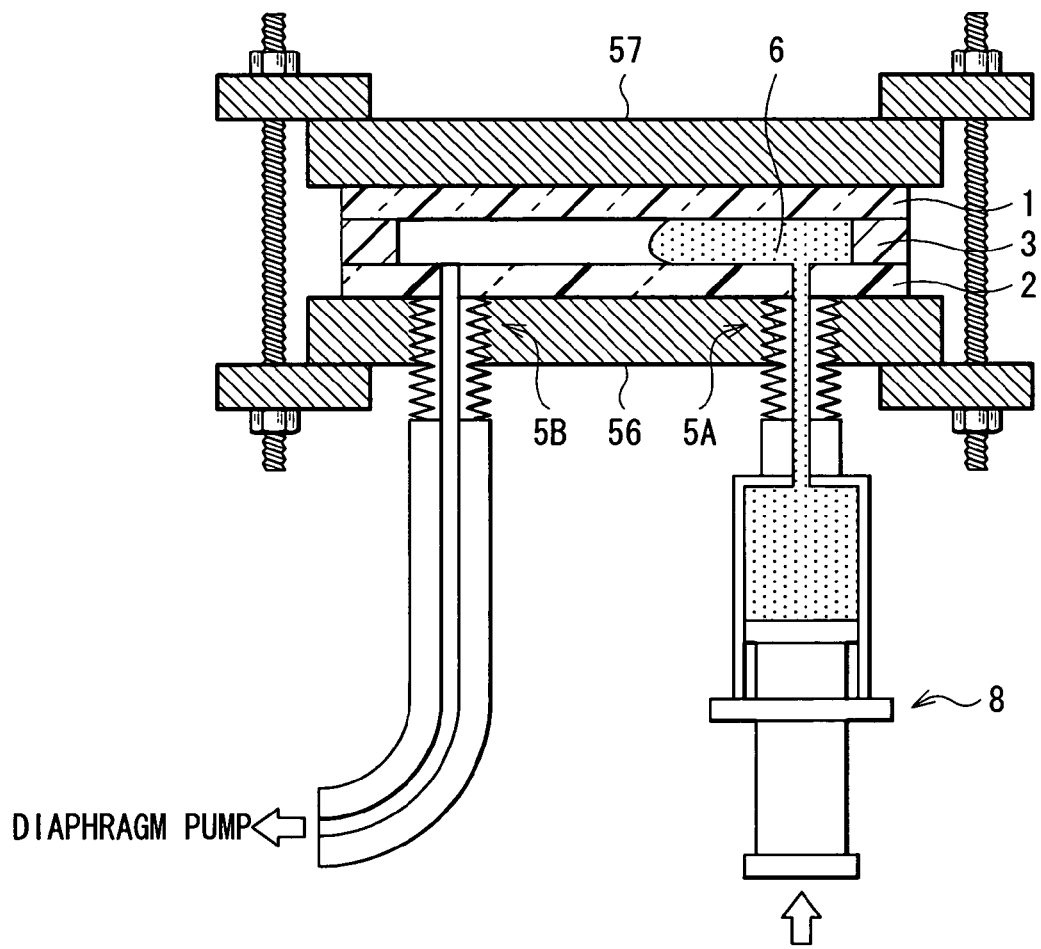
FIG. 21 is an explanation drawing of a method of manufacturing an electrodeposition display panel according to an example of the present invention.

An aluminum plate 56 being 1 cm thick with the same arrangement of the opening 5A and the opening 5B as of the Zeonoa substrates 1 and 2, in which the same gauge bores as of the openings 5A and 5B were screw-cut was prepared. The cell was laid thereon by aligning the positions of the opening 5A and the opening 5B, an acrylic plate 57 being 1 cm thick was laid from the opposite side, and the cell was fixed by a clamp (FIG. 21). The opening 5B was connected to a diaphragm pump through a polyethylene tube whose end was screw-cut in the same gauge as of the opening 5B. While depressurization was performed from the opening 5B, the piston of the injector 8 connected to the opening 5A was pressed, and the display material 6 was injected into the cell. Then, care was taken in order to prevent a constant flow from being formed in the display material 6 in the cell. The display material 6 was expanded in the cell, and sucked out from the opening 5B. Injection was stopped when the display material 6 was filled all over the cell, and air bubbles mixed in the display material 6 in the process of injection were discharged together with the display material 6 from the opening 5B.

The cell was taken out by removing the fastener. A small piece of Zeonoa film (film thickness: 200 μm) was laid on the opening 5A and the opening 5B. The circumference of the small piece was adhered with an epoxy adhesive (manufactured by Ciba Geigy Ltd., trade name: Araldite) (refer to FIG. 15). The resultant was heated in an oven at 100 deg C. for 10 minutes to harden the display material 6 filled in the cell. The resultant was provided with electric wiring to obtain a display.

Example 6

A Zeonoa film substrate having a film thickness of 200 μm provided with a silver electrode (manufactured by Nippon Zeon) was used as the rear substrate 42. On a long side of this substrate, two circular openings 5A being 4.0 mm in diameter were drilled. For both the rear substrate 42 and the display substrate 41, the Zeonoa film finished with surface oxidation treatment was provided with an electrode. Surface oxidation treatment was performed by soaking a commercially available film into a mixed solution with a weight ratio of concentric sulfuric acid:potassium dichromate:water=600:30:48, which was heated for 30 minutes at 80 deg C., and then washed with purified water. The circular opening 5B being 2.0 mm in diameter was drilled in the other end of the substrate. Then, the opening 5A and the opening 5B were located inside the portion coated with an adhesive and outside the portion to become pixels.

Next, a film type hot melt adhesive 3 (manufactured by Aichi plastics Kogyo) being 55 μm thick, which was stamped being 70'90 mm2 and 5 mm wide in accordance with the edge of the substrate was laid. In the portion to become pixels inside the film type hot melt adhesive 3, glass beads being 100 μm in diameter were dispersed as a spacer. Then, on an inner mold 44 in the shape of a semicylinder (R=100 mm, made of aluminum), the Zeonoa film substrate 41 provided with an ITO electrode being 90'90 mm2 (film thickness of the film section: 200 μm) was laid, and the Zeonoa film substrate 42 dispersed with the spacer was laid thereon. Further, a corresponding outer die (made of stainless) was thereon laid, and the cell was tightly fixed by a fastener. From above the outer die, the portion of the hot melt adhesive on the edge of the substrate was heated by a heat gun, and the cell was sealed. The outer die was removed, and integrity of sealing was checked.

Figure 22:
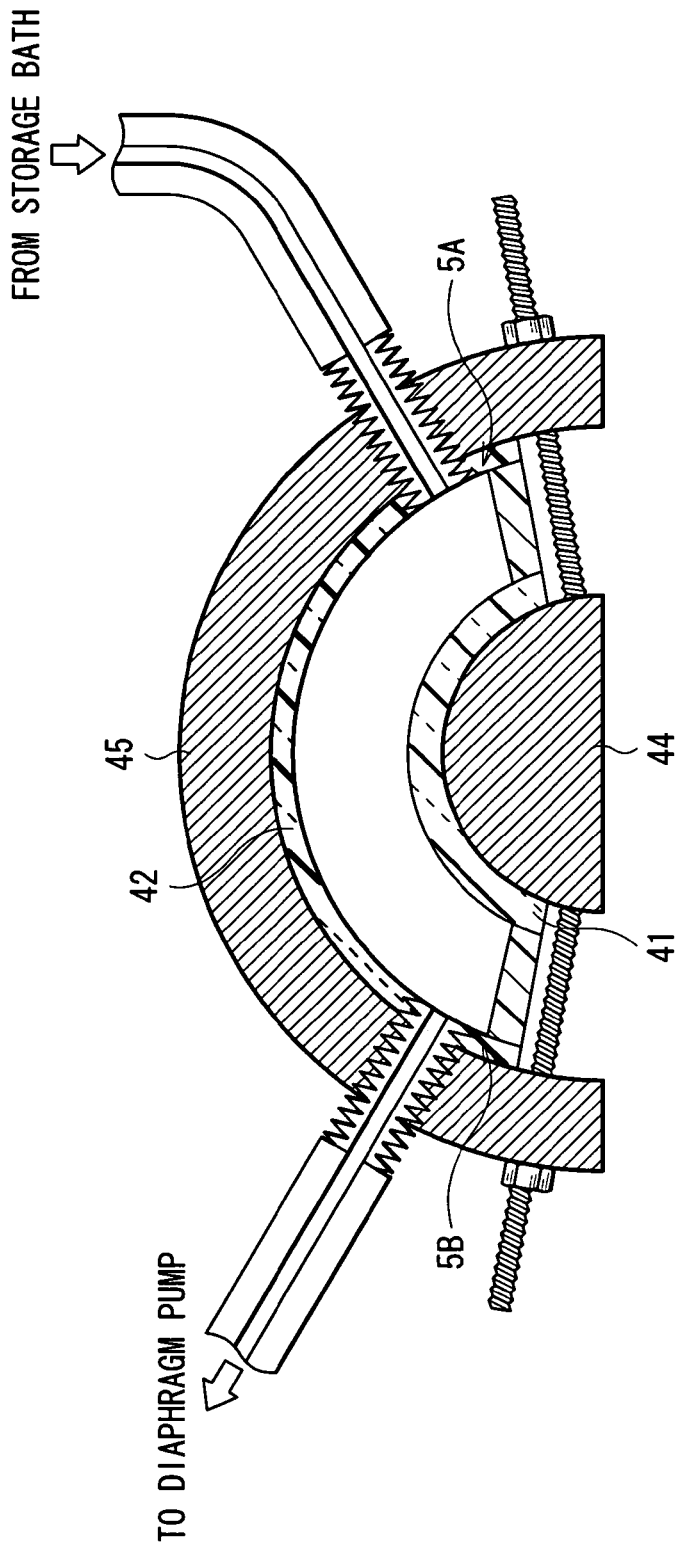
FIG. 22 is an explanation drawing of a method of manufacturing an electrodeposition display panel according to an example of the present invention.
Figure 23:
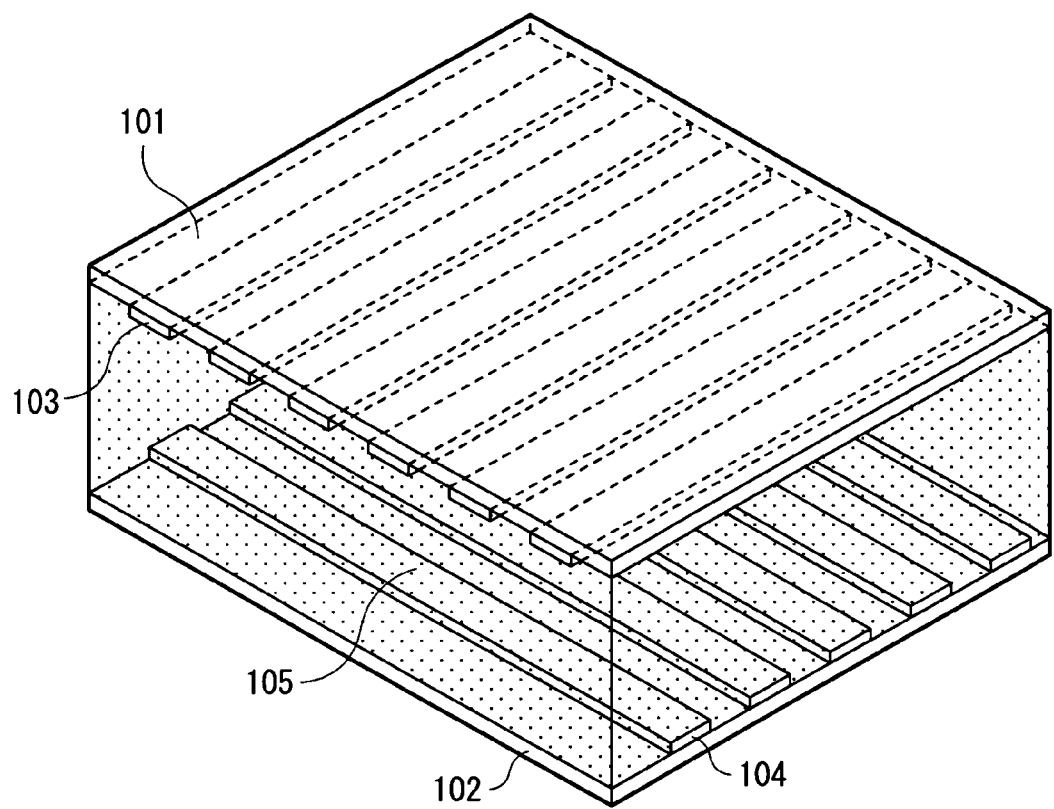
FIG. 23 is a cross section construction view of a general electrodeposition display panel.
Figure 24:
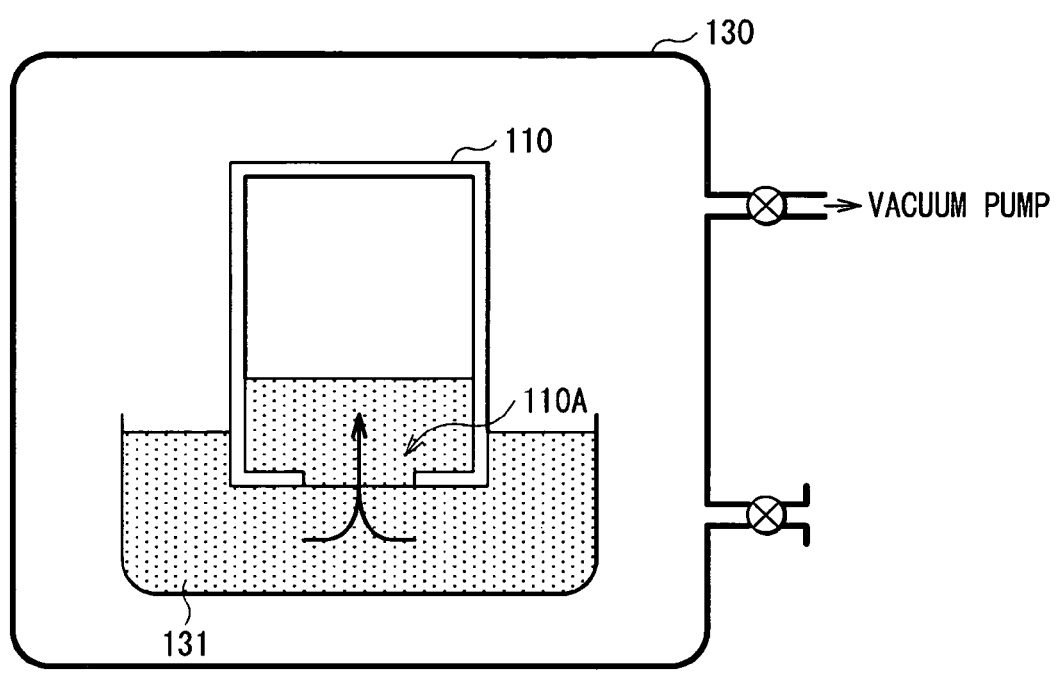
FIG. 24 is an explanation drawing of a vacuum injection method.
Figure 25A:
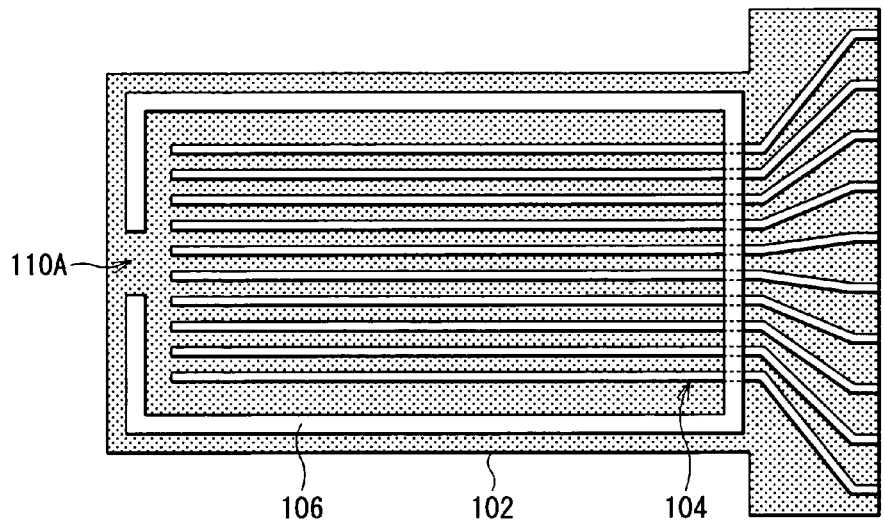
FIGS. 25A and 25B are views for explaining a traditional method of manufacturing an electrodeposition display panel.
Figure 25B:
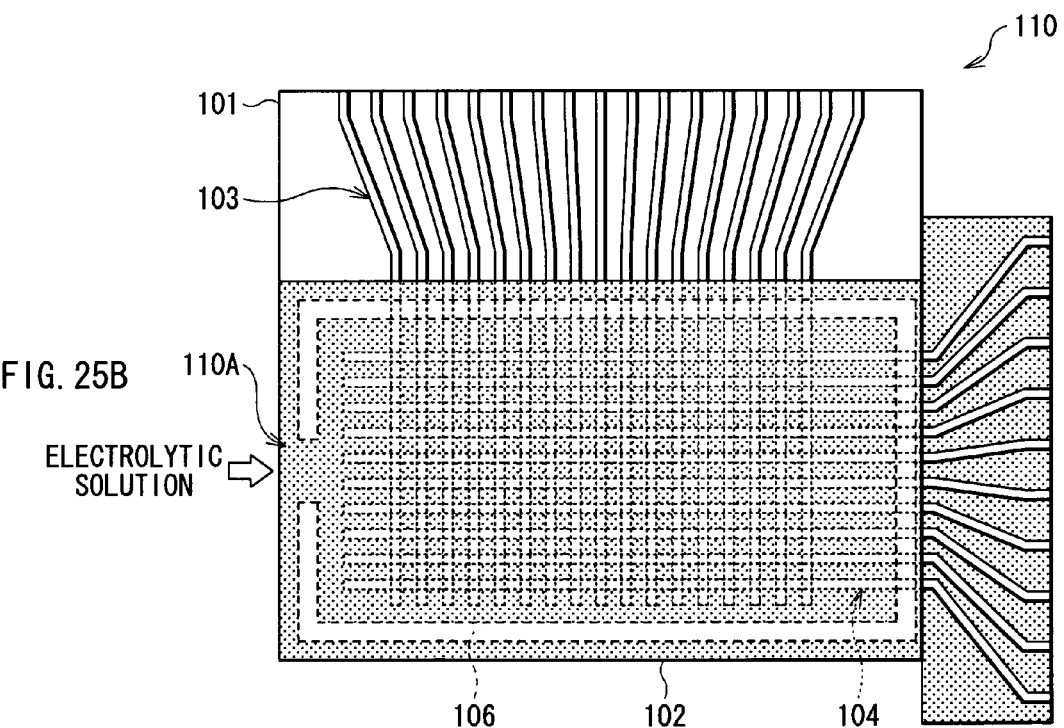
Figure 26:
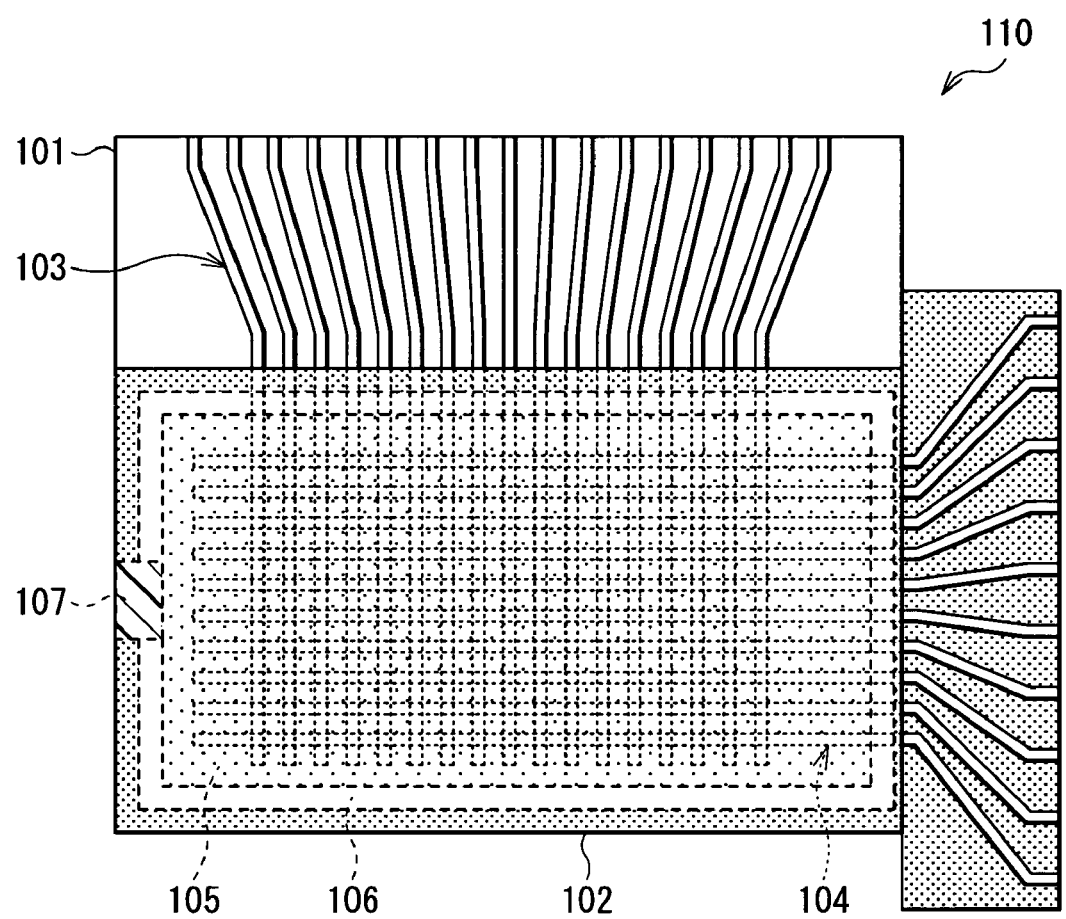
FIG. 26 is a plan construction view of a traditional electrodeposition display panel.
Figure 27:
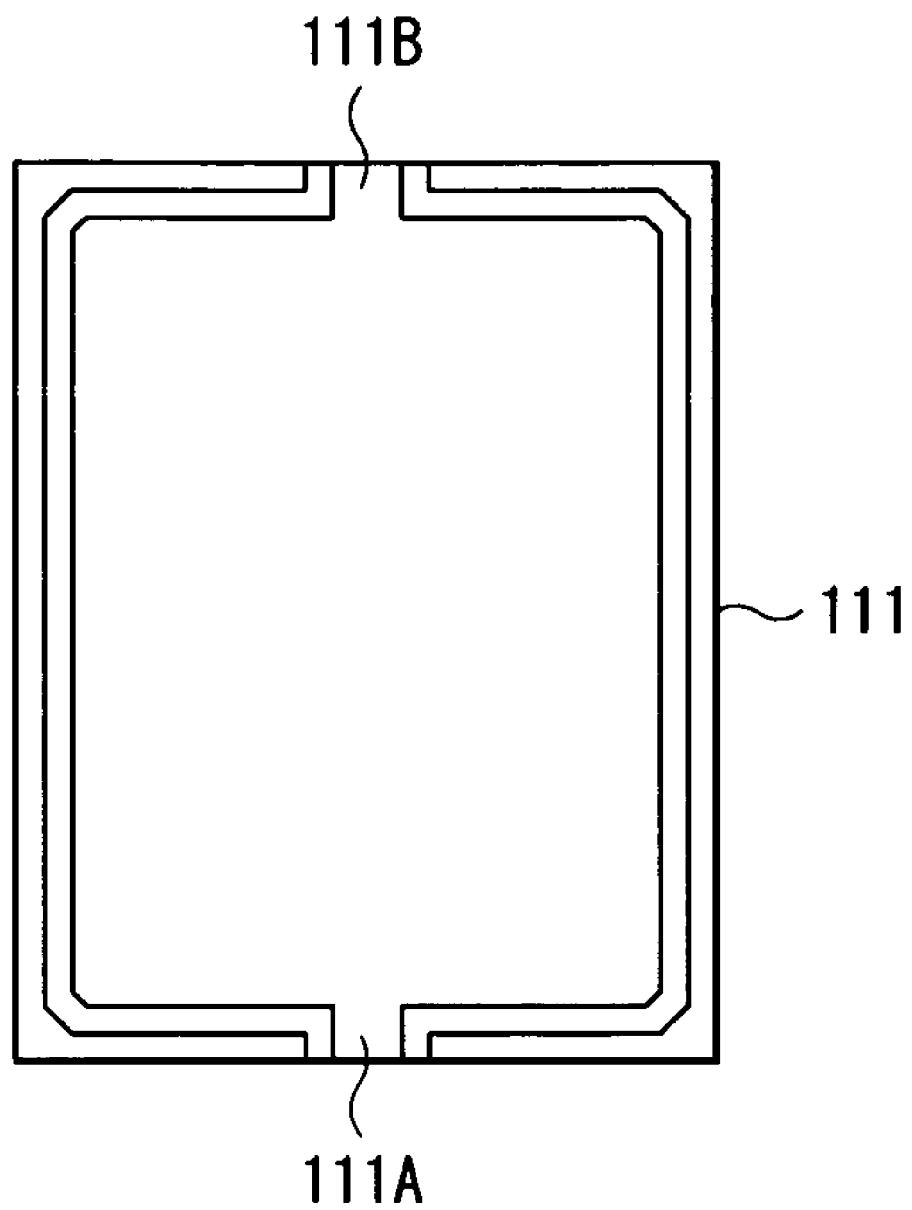
FIG. 27 is a view for explaining a traditional method of manufacturing a liquid crystal panel.
Figure 28:
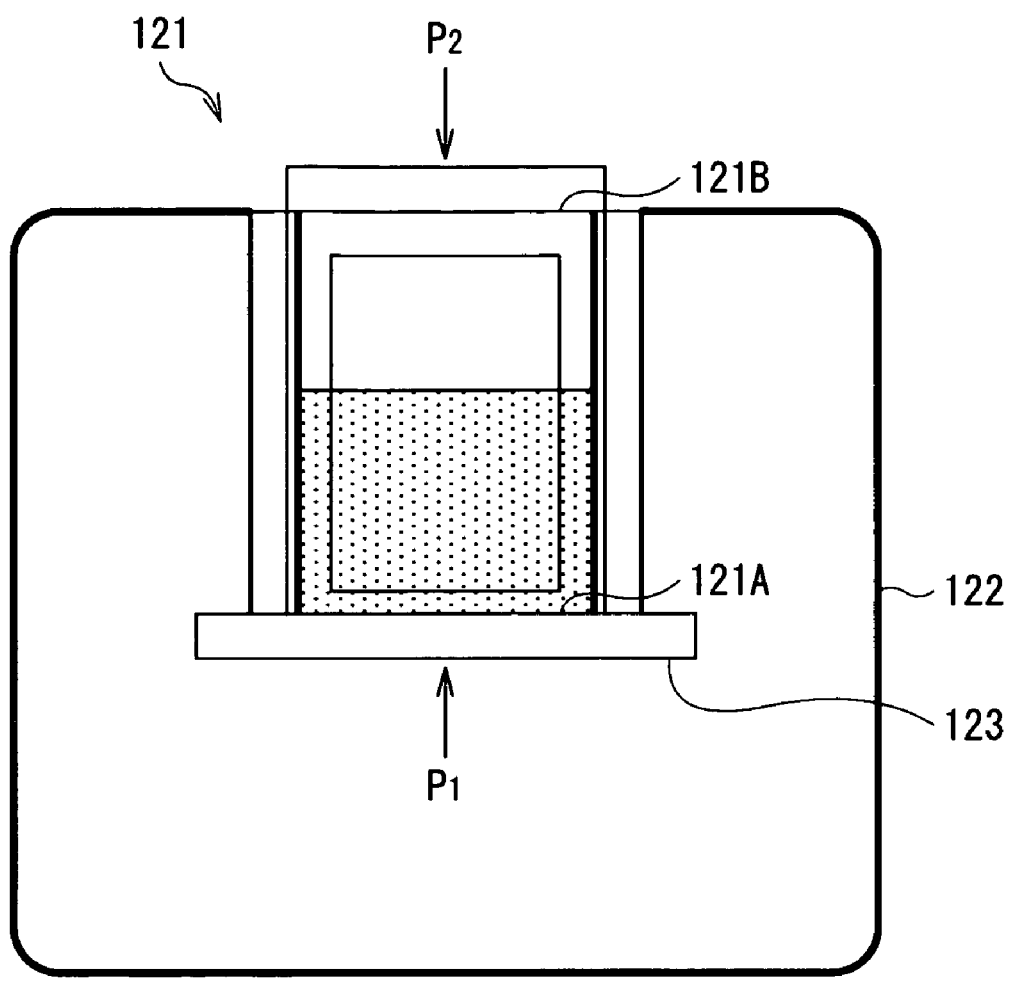
FIG. 28 is a view for explaining a traditional method of manufacturing a liquid crystal panel.

Next, other outer die (made of PMMA) was thereon laid, the cell was tightly fixed by a fastener, and an injection nozzle and a discharge nozzle of the display material 6 were connected (FIG. 22). The discharge nozzle was connected to a diaphragm pump through a polyethylene tube, and depressurization was performed from the opening 5B. The injection nozzle was connected to a storage bath of the display material 6 through a polyethylene tube, and the same display material 6 as used in Example 5 was pressure-injected. Then, care was taken in order to prevent a constant flow from being formed in the display material 6 in the cell. Injection was stopped when the display material 6 was filled all over the cell, and air bubbles mixed in the display material 6 in the process of injection were discharged together with the display material 6 from the opening 5B.

The cell was taken out by removing the fastener. A small piece of Zeonoa film (film thickness: 200 μm) was laid on the opening 5A and the opening 5B. The circumference of the small piece was adhered with an epoxy adhesive (manufactured by Ciba Geigy Ltd., trade name: Araldite) (refer to FIG. 15). The resultant was heated in an oven at 100 deg C. for 10 minutes to harden the display material 6 filled in the cell. The resultant was provided with electric wiring to obtain a display.

Example 7

In the opposing corners of the same glass epoxy substrate used in Example 1 (rear substrate 2), the circular opening 5A being 2.0 mm in diameter and the circular opening 5B being 2.0 mm in diameter were drilled. The film type hot melt adhesive 3 (manufactured by Du Pont) being 25 μm thick, which was stamped being 70×90 mm$^2$ and 5 mm wide correspondingly to the edge of the substrate was laid. Then, the opening 5A and the opening 5B were located inside the film type hot melt adhesive 3 and outside the portion to become pixels. A polypropylene unwoven cloth kneaded with 10 wt % titanium oxide (film thickness: 150 μm, manufactured by Kuraray Co., Ltd.) was cut out in the size of 60×80 mm$^2$, the same shape as of the stamped portion of the hot melt adhesive 3. The polypropylene unwoven cloth was laid inside the hot melt adhesive 3, the glass substrate provided with an ITO electrode being 90×90 mm$^2$ (transparent electrode substrate 1) was thereon laid, and thermocompression bonding was performed under the conditions of 140 deg C., 0.2 MPa, and 10 sec to fabricate a cell. The unwoven cell and the hot melt adhesive also function as a spacer between the substrates. The unwoven cloth has a function as a white background.

The same display material 6 as used in Example 4 was sucked in a 10 ml injector made of polypropylene, and the nozzle of the injector was inserted into the opening 5A with no gap. A tube made of polyethylene (outer diameter: 2.0 mm, inner diameter: 1.0 mm) was inserted into the opening 5B without gap. In this state, the display material 6 was injected into the cell by pressing the piston of the injector. Injection was stopped when the display material 6 was penetrated in the unwoven cloth, and air bubbles mixed in the display material 6 in the process of injection were all discharged together with the display material 6 from the opening 5B.

The cell was sandwiched between glass plates, pressurized until the thickness of the central part of the cell became the same as of the edge thereof to flow out the electrolytic solution from the opening 5B. After the injector of the opening 5A and the tube of the opening 5B were removed, the opening 5A and the opening 5B were simply sealed by cellophane tape. Further, a polypropylene sheet coated with an epoxy adhesive (manufactured by Ciba Geigy Ltd., trade name: Araldite) was affixed to the whole area of the rear substrate 2 provided with the opening 5A and the opening 5B. The resultant was heated in an oven at 100 deg C. for 10 minutes to harden the electrolytic solution filled in the cell and the epoxy adhesive of the sheet affixed to the substrate. The resultant was provided with electric wiring to obtain a display.

The present invention is not limited to the foregoing descriptions, but modifications may be made as appropriate. For example, in the embodiment, shapes and arrangements of the opening have been described with reference to various examples. However, the number and the arrangement of the opening are not particularly limited. As described in the embodiment, the opening may be the shape obtained by simply forming a circular bore in the substrate. Otherwise, a cylindrical projection to fix the injection nozzle or the discharge nozzle can be attached to the bore. Further, the larger the diameter of the opening 5A drilled through the substrate is, the shorter the filling time is, even if a display material with a high viscosity is used. A combination of these shapes of the opening can be used.

Further, instead that the nozzle is directly connected to the opening, the nozzle may be indirectly connected to the opening through an adapter or the like. As a method of pressurizing a display material, a method using compressed gas, a method using a heavy load, a method using elastic force, a method using centrifugal force or the like can be adopted, or any other method may be used.

Further, in the foregoing embodiment and Examples, regarding methods of sealing cell and types of spacers have been described with reference to various specific examples. However, in the present invention, the mode of the cell is not limited except that openings for injection and discharge are provided. The exemplified modes may be used as a matter of course, and other modes may be used. In any case, in view of applying the method of manufacturing an electrodeposition display panel of the present invention, it is important to completely seal sections of the cell except for the openings before injecting the display material.

The method of manufacturing an electrodeposition display panel of the present invention is characterized in the filling process of the display material. Therefore, any driving method of the panel to be manufactured may be adopted. In general, simple matrix method, active matrix method or the like is adopted. In the case of the active matrix driving method, it is necessary to form a driving thin film transistor on the transparent substrate corresponding to each pixel. The electrodeposition display panel and the electrodeposition display device of the present invention may correspond to any method thereof.

As described above, according to the method of manufacturing an electrodeposition display panel of the present invention, the following step is included. That is, in the step, for the cell including the space which is formed between the pair of substrates, and which connects outside through one or a plurality of first openings for injecting the display material and one or a plurality of second openings for discharging the display material; the display material is discharged from the second opening while being injected from the first opening in a state that the display material has fluidity, and thereby the display material is filled. Therefore, compared to the traditional depressurization injection method, the display material can be filled in the cell in a significantly short time. The display material used for the electrodeposition display panel has a high viscosity, and therefore such a method, in which while the display material is pressurized, evacuation of the space is provided to positively shove in the display material is suitable. Further, since the thickness of the space (substrate gap) is wider than of the other types of display panels such as a liquid crystal panel. Therefore, such pressurization is effectively operated in the step of filling. Further, by discharging the display material from the second opening, air bubbles mixed in the cell, powder material separated in the cell during filling and the like are pushed out together, and therefore the cell can be filled with only the uniform display material. Therefore, the electrodeposition display panel can be effectively manufactured while the display quality thereof is maintained.

In particular, when the display material is pressure-injected, filling time can be further shortened. Further, even if a display material with a high viscosity is injected, or even if injection resistance becomes larger since a separation preventive layer is formed on the substrate, filling is available in a short time.

Further, when the display material is discharged at the pressure equal to or less than the ambient pressure, filling the display material is promoted by the differential pressure between the injection pressure and the depressurization due to evacuation. Therefore, filling time is shortened compared to when only pressurization is performed, and the filling step can be performed more effectively.

Further, when the first and the second openings are formed in any of the pair of substrates, sealing can be easily and surely performed because of the position factor.

Further, when the display material is injected and discharged after a nozzle is temporarily attached to at least one of the first and the second openings, adjustment of pressurization and depressurization to the inside of the cell can be conveniently performed. Further, when the nozzle is used as above and when a mask is provided on the circumferential section of at least one of the first and the second openings, the injected or discharged display material can be prevented from being adhered to the circumference of the opening, and after that the opening can be sealed effectively and surely.

Further, the electrodeposition display panel of the present invention and the electrodeposition display device of the present invention include the pair of substrates, which is oppositely arranged and has each electrode on each opposed face; the layer which is sandwiched between the pair of substrates, and which is made of the display material containing metal ions and having fluidity at least temporarily; the sealing material provided on the side edge of the layer made of the display material; and the two or more openings which are provided in the substrate or the sealing material, and in a state of being sealed. Therefore, the layer made of the display material contain no bubbles and can be uniform by injection and discharge of the display material through the openings. Therefore, high reliability can be given to the display quality.

The invention claimed is:

1. An electrodeposition display panel manufacturing method in which a display material which contains metal ions is sandwiched between a pair of substrates, comprising:
    attaching the substrates with a space between the pair of substrates, and forming at least first and the second openings providing access to the space, the openings being provided in either substrate or at least one in each substrate, the space being connected to the outside through one or a plurality of first openings for injecting the display material and one or a plurality of second openings for discharging the display material,
    filling the space by discharging the display material from the second opening while injecting the display material from the first opening wherein the display material is pressure-injected and an injection pressure during pressure-injection is equal to or more than the ambient pressure.

2. A method of manufacturing an electrodeposition display panel according to claim 1, wherein the display material is discharged at the pressure equal to or less than the ambient pressure.

3. A method of manufacturing an electrodeposition display panel according to claim 1, wherein a viscosity of the display material is 30,000 mPa·s or less.

4. A method of manufacturing an electrodeposition display panel according to claim 1, wherein an electrolytic solution containing metal ions is used as the display material.

5. A method of manufacturing an electrodeposition display panel according to claim 4, wherein one or more materials colored with a color different from of the electrolytic solution is mixed in the electrolytic solution.

6. A method of manufacturing an electrodeposition display panel according to claim 1, wherein a height of the space is from 30 pm to 150 pm.

7. A method of manufacturing an electrodeposition display panel according to claim 1, wherein the space is provided with a supporting member for uniformly supporting and fixing the shape thereof.

8. A method of manufacturing an electrodeposition display panel according to claim 1, wherein at least one of the pair of substrates is a resin substrate and the first and the second openings are formed in the resin substrate.

9. A method of manufacturing an electrodeposition display panel according to claim 1, wherein one first opening and one second opening are respectively formed in a pair of opposing camera in one of the substrates.

10. A method of manufacturing an electrodeposition display panel according to claim 1, wherein the first openings are formed in two corners of one side of one of the substrates, and the second opening is formed in the central part of the same substrate.

11. A method of manufacturing an electrodeposition display panel according to claim 1, wherein the first openings are formed in adjacent two camera of one of the substrates, and the second openings are formed in the two corners opposing to the two corners where the first openings are formed of the same substrate.

12. A method of manufacturing an electrodeposition display panel according to claim 1, wherein the first openings are formed in four corners of one of the substrates, and the second openings are respectively formed in the central part of the two opposed sides of the same substrate.

13. A method of manufacturing an electrodeposition display panel according to claim 1, wherein a mask is provided on a circumference portion of at least one of the first and the second openings, and then injection and discharge of the display material is performed.

14. A method of manufacturing an electrodeposition display panel according to claim 1, wherein, a nozzle is temporarily attached to at least one of the first and the second openings, and then injection and discharge of the display material is performed.

15. A method of manufacturing an electrodeposition display panel according to claim 14, wherein the nozzle attached to the first opening is integrally provided with a supply means for extrusion supplying the display material at the end on the opposite side of the attachment side.

16. A method of manufacturing an electrodeposition display panel according to claim 14, wherein the nozzle to be attached to the first opening is provided with a gas supply path for sending gas to the first opening through the nozzle.

17. A method of manufacturing an electrodeposition display panel according to claim 14, wherein the nozzle has a shape in which an outer shape of the end on the attachment side is tapered, and the end on the attachment side of the nozzle is inserted in the opening.

18. A method of manufacturing an electrodeposition display panel according to claim 14, wherein the nozzle is firmly fixed to the surface of the substrate, and thereby the nozzle is attached to the opening.

19. A method of manufacturing an electrodeposition display panel according to claim 14, wherein a mask is provided on at least the circumference portion of the opening of the substrate, and a nozzle is attached to the opening through the mask.

20. A method of manufacturing an electrodeposition display panel according to claim 14, wherein a screw is provided inside the opening and at the end on the attachment side of the nozzle, and the end on the attachment side is screwed in the opening.

21. A method of manufacturing an electrodeposition display panel according to claim 20, wherein after the first step, the opening is sealed by a screw tap.

22. A method of manufacturing an electrodeposition display panel according to claim 1, wherein, the substrates are secured within a jig which has a pair of fixing faces corresponding to respective shapes of the pair of substrates, and the jig fixes the pair of substrates.

23. A method of manufacturing an electrodeposition display panel according to claim 22, wherein the first or the second opening is provided in at least one of the pair of substrates, a jig to which a nozzle is fixed on the fixing face is used as the jig, and the nozzle is temporarily attached to the opening.

24. A method of manufacturing an electrodeposition display panel according to claim 1, wherein the first and the second openings are formed in any of the pair of substrates when the pair of substrates is oppositely arranged at a given gap.

25. A method of manufacturing an electrodeposition display panel according to claim 24, wherein a separation preventive layer for preventing separation of the display material from the substrate is formed.

26. A method of manufacturing an electrodeposition display panel according to claim 1, further comprising sealing the first and the second openings.

27. A method of manufacturing an electrodeposition display panel according to claim 26, wherein the opening is sealed by a convex tap.

28. A method of manufacturing an electrodeposition display panel according to claim 26, wherein the opening is sealed by being covered with a film or a flat plate.

29. A method of manufacturing an electrodeposition display panel according to claim 28, wherein the whole area of the substrate in which the opening is formed is covered with the film or the flat plate.

30. A method of manufacturing an electrodeposition display panel according to claim 26, wherein an adhesive or a resin is filled in an inner void portion of the opening.

31. A method of manufacturing an electrodeposition display panel according to claim 1, wherein, the display material is gelated.

32. An electrodeposition display panel comprising:
a pair of substrates secured to each other with a space therebetween;
a display material containing metal ions located in the space between the pair of substrates;
a sealing material provided between the first and second substrates around the perimeter of the space between the substrates; and
wherein there are two or more openings which are provided through a surface of the substrates providing access to the space, wherein the opening is provided with a thread inside thereof, and is sealed by a threaded tap.

33. An electrodeposition display panel comprising:
a pair of substrates secured to each other with a space therebetween;
a display material containing metal ions located in the space between the pair of substrates;
a sealing material provided between the first and second substrates around the perimeter of the space between the substrates; and
wherein there are two or more openings which are provided through a surface of the substrates providing access to the space, wherein the opening is sealed by a convex tap.

34. An electrodeposition display panel comprising:
a pair of substrates secured to each other with a space therebetween;
a display material containing metal ions located in the space between the pair of substrates;
a sealing material provided between the first and second substrates around the perimeter of the space between the substrates; and
wherein there are two or more openings which are provided through a surface of the substrates providing access to the space, wherein a separation preventive layer for preventing the layer made of the display material from being separated from the substrate is formed between the layer made of the display material and the substrate on the metal deposition side.

35. An electrodeposition display device comprising:
a pair of substrates secured together with a space therebetween;
a display material containing metal ions located in the space between the substrates;
a sealing material provided between the first and second substrates around the perimeter of the space between the substrates; and wherein there are two or more openings which are provided through a surface of the substrates providing access to the space, wherein the opening is provided with a thread inside thereof, and is sealed by a threaded tap.

36. An electrodeposition display device comprising:
a pair of substrates secured together with a space therebetween;

a display material containing metal ions located in the space between the substrates;

a sealing material provided between the first and second substrates around the perimeter of the space between the substrates; and wherein there are two or more openings which are provided through a surface of the substrates providing access to the space, wherein the opening is sealed by a convex tap.

37. An electrodeposition display device comprising:

a pair of substrates secured together with a space therebetween;

a display material containing metal ions located in the space between the substrates;

a sealing material provided between the first and second substrates around the perimeter of the space between the substrates; and wherein there are two or more openings which are provided through a surface of the substrates providing access to the space, wherein the inside of the opening is filled with an adhesive or a resin.

38. An electrodeposition display device comprising:

a pair of substrates secured together with a space therebetween;

a display material containing metal ions located in the space between the substrates;

a sealing material provided between the first and second substrates around the perimeter of the space between the substrates; and wherein there are two or more openings which are provided through a surface of the substrates providing access to the space, wherein a separation preventive layer is formed between the layer made of the display material and the substrate on the metal deposition side.

* * * * *